US012707427B2

(12) United States Patent
Xiong

(10) Patent No.: US 12,707,427 B2
(45) Date of Patent: Aug. 11, 2026

(54) METHOD AND APPARATUS FOR INDICATING LOCATION OF SATELLITE CELL, USER EQUIPMENT, NETWORK DEVICE, AND STORAGE MEDIUM

(71) Applicant: Beijing Xiaomi Mobile Software Co., Ltd., Beijing (CN)

(72) Inventor: Yi Xiong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 220 days.

(21) Appl. No.: 18/565,304

(22) PCT Filed: Jun. 2, 2021

(86) PCT No.: PCT/CN2021/098003
§ 371 (c)(1),
(2) Date: Nov. 29, 2023

(87) PCT Pub. No.: WO2022/252160
PCT Pub. Date: Dec. 8, 2022

(65) Prior Publication Data
US 2024/0205874 A1 Jun. 20, 2024

(51) Int. Cl.
*H04W 64/00* (2009.01)
*H04W 36/36* (2009.01)
*H04W 76/20* (2018.01)
*H04W 84/06* (2009.01)

(52) U.S. Cl.
CPC ....... *H04W 64/003* (2013.01); *H04W 36/362* (2023.05); *H04W 76/20* (2018.02); *H04W 84/06* (2013.01)

(58) Field of Classification Search
None
See application file for complete search history.

(56) References Cited

U.S. PATENT DOCUMENTS

2019/0342000 A1* 11/2019 Zheng ................ H04B 7/18517
2020/0187073 A1* 6/2020 Ma ........................ H04W 36/30
2020/0213000 A1* 7/2020 Arur .................... H04B 7/1851
(Continued)

FOREIGN PATENT DOCUMENTS

CN 101950025 A 1/2011
CN 110708754 A 1/2020
(Continued)

OTHER PUBLICATIONS

International Search Report issued Feb. 24, 2022 in PCT/CN2021/098003, filed on Jun. 2, 2021, 4 pages (with English Translation).
(Continued)

*Primary Examiner* — Adolf Dsouza
(74) *Attorney, Agent, or Firm* — Oblon, McClelland, Maier & Neustadt, L.L.P.

(57) ABSTRACT

A user equipment (UE) receives information indicated by a network device, where the information comprises at least one of following: satellite ephemeris information, satellite cell reference location information, or a satellite identification corresponding to a satellite cell, and determines a relative locational relationship between the UE and a satellite cell reference location according to the information indicated by the network device.

17 Claims, 7 Drawing Sheets

Determine satellite cell reference location information according to information indicated by the network-side device — 201

Determine a distance between a UE and a satellite cell reference location according to the satellite cell reference location information — 202

(56) References Cited

U.S. PATENT DOCUMENTS

2021/0204147 A1* 7/2021 Axmon ............... H04L 41/0677
2022/0369264 A1* 11/2022 Cheng ............... H04W 56/0045

FOREIGN PATENT DOCUMENTS

CN 111182594 A 5/2020
CN 111294733 A * 6/2020 ............ H04W 24/10
CN 111314392 A 6/2020
CN 111867041 A 10/2020
CN 112399548 A 2/2021
CN 112640531 A 4/2021
WO WO 2020/165675 A1 8/2020

OTHER PUBLICATIONS

Chinese Office Action dated Mar. 21, 2026, issued In Chinese Patent Application No. 202180001766,X (with English translation: Documents 18-22 being cited therein).

* cited by examiner

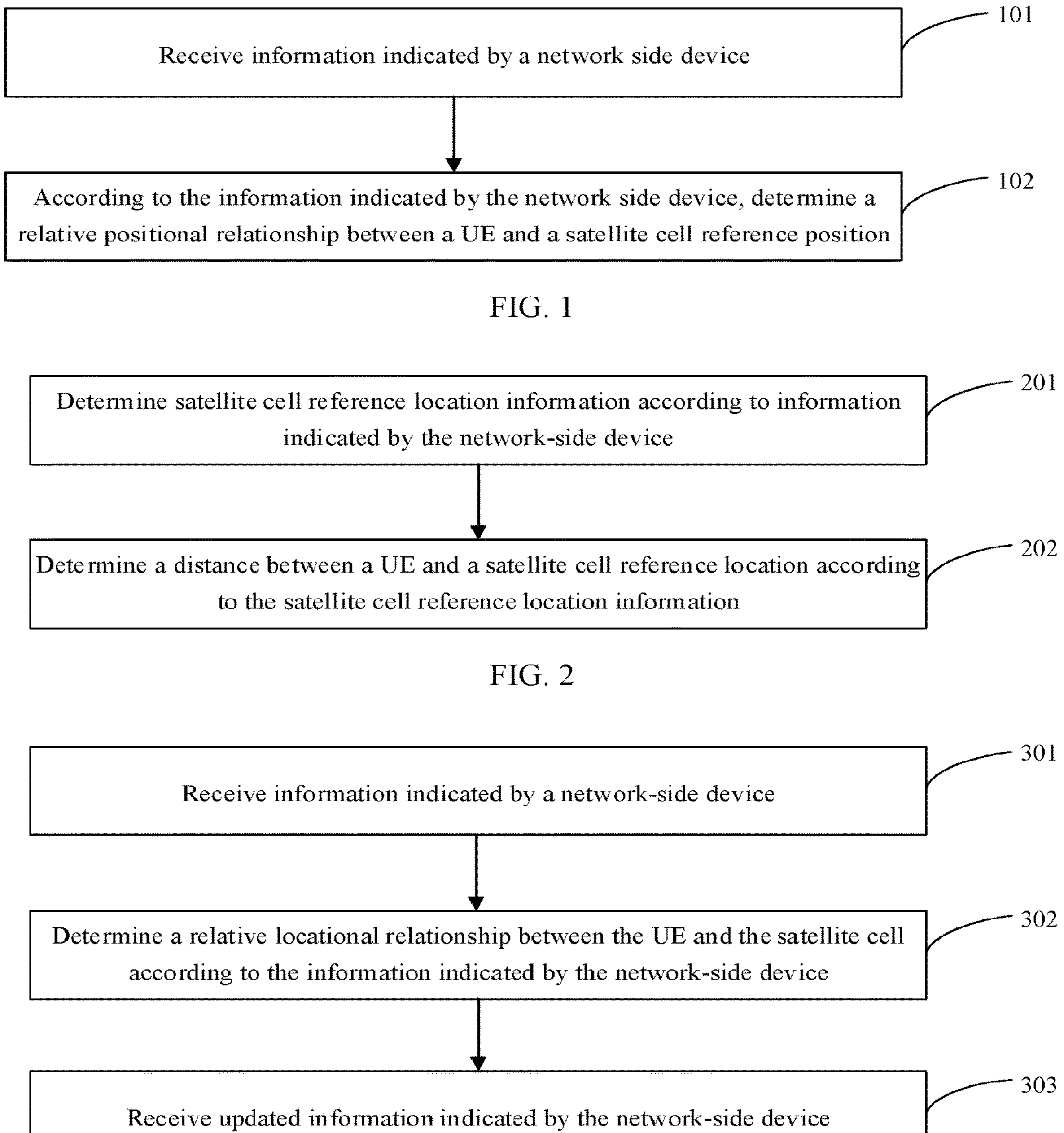
Receive information indicated by a network side device
101
According to the information indicated by the network side device, determine a relative positional relationship between a UE and a satellite cell reference position
102
FIG. 1
Determine satellite cell reference location information according to information indicated by the network-side device
201
Determine a distance between a UE and a satellite cell reference location according to the satellite cell reference location information
202
FIG. 2
Receive information indicated by a network-side device
301
Determine a relative locational relationship between the UE and the satellite cell according to the information indicated by the network-side device
302
Receive updated information indicated by the network-side device
303
FIG. 3

METHOD AND APPARATUS FOR INDICATING LOCATION OF SATELLITE CELL, USER EQUIPMENT, NETWORK DEVICE, AND STORAGE MEDIUM

CROSS-REFERENCE TO RELATED APPLICATION

The application is a U.S. National Stage of International Application No. PCT/CN2021/098003 filed on Jun. 2, 2021, the entire content of which is incorporated herein by reference for all purposes.

BACKGROUND

Technical Field

The present disclosure relates to the field of communication technologies, and in particular, to a method and apparatus for indicating a location of a satellite cell, a user equipment, a network device and a storage medium.

Description of the Related Art

Non-Terrestrial Network (NTN) introduces a location-based Conditional Handover (CHO) trigger condition to avoid ping-pong handover between cells. The location-based CHO trigger condition may include: performing cell handover based on satellite cell location information (for example, the center location of the satellite cell).

SUMMARY

The present disclosure proposes a method and apparatus for indicating a location of a satellite cell, a user equipment, a network device, and a storage medium, so as to provide a method for configuring a location of a satellite cell for a UE.

An embodiment of the present disclosure proposes a method for indicating a location of a satellite cell, which is performed by a UE, and includes receiving information indicated by a network device, where the information includes at least one of following: satellite ephemeris information, satellite cell reference location information, or a satellite identification corresponding to a satellite cell, and determining a relative locational relationship between the UE and the satellite cell reference location according to the information indicated by the network device.

Another embodiment of the present disclosure proposes a method for indicating a location of a satellite cell, which is performed by a network device, and includes indicating information to a UE, the information including at least one of following: satellite ephemeris information, satellite cell reference location information, or a satellite identification corresponding to a satellite cell.

An apparatus for indicating a location of a satellite cell proposed by an embodiment in yet another aspect of the present disclosure includes a receiving module, configured to receive information indicated by a network device, the information including at least one of following: satellite ephemeris information, satellite cell reference location information, and a satellite identification corresponding to a satellite cell, and a determining module, configured to determine a relative locational relationship between a UE and the satellite cell according to the information indicated by the network device.

An apparatus for indicating a location of a satellite cell proposed by an embodiment in yet another aspect of the present disclosure includes an indication module, configured to indicate information to a UE, the information including at least one of following: satellite ephemeris information, satellite cell reference location information, or a satellite identification corresponding to a satellite cell.

A user equipment provided by an embodiment of yet another aspect of the present disclosure includes a transceiver, a memory, and a processor connected to the transceiver and the memory respectively, and configured to, by executing non-transitory computer-executable instructions on the memory, control the transceiver to receive and send a wireless signal, and can implement the method provided in the embodiment of the above yet another aspect.

A network device provided by an embodiment of yet another aspect of the present disclosure includes a memory and a processor connected to the transceiver and the memory respectively, and configured to, by non-transitory executing computer-executable instructions on the memory, control the transceiver to receive and send a wireless signal, and can implement the method provided in the embodiment of the above yet another aspect.

A computer storage medium is provided by an embodiment in yet another aspect of the present disclosure, where the computer storage medium stores non-transitory computer-executable instructions, and after the computer-executable instructions are executed by a processor, the method as described above can be implemented.

To sum up, in the method and apparatus for indicating a location of a satellite cell, the user equipment, the base station, the core network device, and the storage medium provided by the embodiments of the present disclosure, the UE can receive information indicated by the network device, and the information includes at least one of the following: satellite ephemeris information, satellite cell reference location information, or a satellite identification corresponding to the satellite cell; and the UE may determine the relative locational relationship between the UE and the satellite cell reference location according to the information indicated by the network device, so that the CHO trigger condition based on the relative locational relationship between the UE and the satellite cell reference location can be introduced later. In the embodiments of the present disclosure, the satellite cell reference location information is: the relative locational relationship between the satellite cell reference location and the corresponding satellite, and/or, the relative locational relationship between the satellite cell reference location and the sub-satellite point of the corresponding satellite. And, since the satellite cell reference location information does not move with the movement of the satellite, the network device does not need to frequently update the satellite cell reference location information when performing cell handover based on location, thereby reducing signaling overhead.

Additional aspects and advantages of the present disclosure will be set forth in part in the following description, and will be obvious in part from the following description, or may be learned by practice of the present disclosure.

BRIEF DESCRIPTION OF THE DRAWINGS

The above and/or additional aspects and advantages of the present disclosure will become apparent and understandable from the following description of the embodiments in conjunction with the accompanying drawings, where:

FIG. 1 is a schematic flowchart of a method for indicating a location of a satellite cell provided by an embodiment of the present disclosure;

FIG. 2 is a schematic flowchart of a method for determining a relative locational relationship between a UE and a satellite cell reference location provided by an embodiment of the present disclosure:

FIG. 3 is a schematic flowchart of a method for indicating a location of a satellite cell provided by another embodiment of the present disclosure;

FIG. 10 is a schematic flowchart of a method for indicating a location of a satellite cell provided by another embodiment of the present disclosure;

DETAILED DESCRIPTION OF THE PREFERRED EMBODIMENTS

Figure 4:
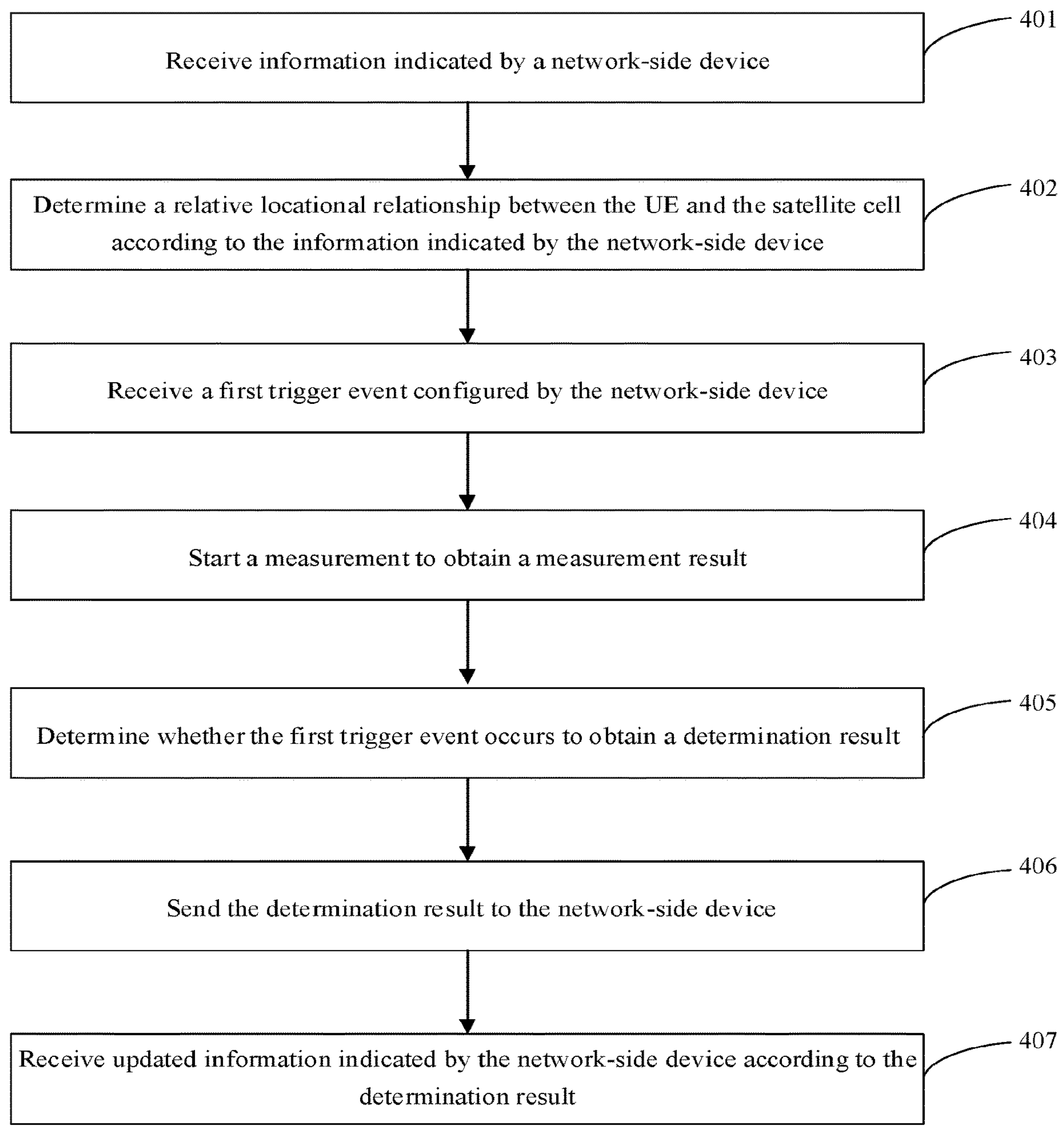
FIG. 4 is a schematic flowchart of a method for indicating a location of a satellite cell provided by another embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the embodiments of the present disclosure. Instead, they are merely examples of apparatuses and methods consistent with aspects related to the embodiments of the present disclosure as recited in the appended claims.

The terms used in the embodiments of the present disclosure are for the purpose of describing particular embodiments only and are not intended to limit the embodiments of the present disclosure. As used in the embodiments of the present disclosure and the appended claims, the singular forms "a/an" and "the" are intended to include the plural forms as well, unless the context clearly dictates otherwise. It should also be understood that the term "and/or" as used herein refers to and includes any or all possible combinations of one or more of the associated listed items.

It should be understood that although the terms first, second, third, etc. may be used in the embodiments of the present disclosure to describe various pieces of information, such information should not be limited by these terms. These terms are only used to distinguish the same type of information from each other. For example, the first information may also be referred to as second information, and similarly, the second information may also be referred to as the first information, without departing from the scope of the embodiments of the present disclosure. Depending on the context, the word "if" as used herein can be interpreted as "at the time of" or "when" or "in response to determining".

The embodiments of the present disclosure are described in detail below, examples of which are illustrated in the accompanying drawings, where the same or similar reference numerals designate the same or similar elements throughout. The embodiments described below by referring to the drawings are exemplary and are intended to explain the present disclosure, and should not be construed as limiting the present disclosure.

The inventor finds out through research that the satellite cell location information (the location information of the satellite cell) is usually configured for the UE in a manner of broadcasting or dedicated signaling. However, in the Earth-moving cell scenario, the coverage of the satellite cell will move with the movement of the satellite, and then the satellite cell location information will also change with the movement of the satellite. Therefore, the satellite cell location information needs to be updated frequently, which increases signaling overhead.

Embodiments of the present disclosure aim to solve the above technical problems, and provide a method and apparatus for indicating a location of a satellite cell, a user equipment, a network device and a storage medium.

In the method for indicating a location of a satellite cell provided by the embodiments of the present disclosure, the UE may receive the information indicated by the network device, and the information includes at least one of the following: satellite ephemeris information, satellite cell reference location information, a satellite identification corresponding to the satellite cell; and the UE may determine the relative locational relationship between the UE and the satellite cell reference location according to the information indicated by the network device, so that a CHO trigger condition based on the relative locational relationship between the UE and the satellite cell reference location can be introduced later. In the embodiments of the present disclosure, the satellite cell reference location information is: the relative locational relationship between the satellite cell reference location and the corresponding satellite, and/or, the relative location between the satellite cell reference location and the sub-satellite point of the corresponding satellite relation. And, since the satellite cell reference location information does not move with the movement of the satellite, the network device does not need to frequently update the satellite cell reference location information when performing cell handover based on location, thereby reducing signaling overhead.

The method and apparatus for indicating a location of a satellite cell, the user equipment, the network device and the storage medium provided by the present disclosure will be described in detail below with reference to the accompanying drawings.

FIG. 1 is a schematic flowchart of a method for indicating a location of a satellite cell provided by an embodiment of the present disclosure, which is performed by a user equipment. As shown in FIG. 1, the method for indicating a location of a satellite cell may include the following steps.

In step 101, information indicated by a network device is received, where the information includes at least one of the following: satellite ephemeris information, satellite cell reference location information, or a satellite identification corresponding to a satellite cell.

It should be noted that the indication method in the embodiments of the present disclosure may be performed by any UE. The UE may be a device that provides voice and/or data connectivity to a user. The UE may communicate with one or more core networks via Radio Access Network (RAN). The UE may be a terminal of Internet of Things, such as a sensor device, a mobile phone (or called a "cellular" phone), and a computer with a terminal of Internet of Things, for example, which may be a fixed, portable, pocket, hand-held, computer-built-in or vehicle-mounted apparatus, such as a Station (STA), a subscriber unit, a subscriber station, a mobile station, a mobile, a remote station, an access point, a remote terminal, an access terminal, a user terminal, or a user agent. Alternatively, the UE may also be a device of an unmanned aerial vehicle. Alternatively, the UE may also be a vehicle-mounted device, for example, it may be a trip computer with a wireless communication function, or a wireless terminal connected externally to the trip computer. Alternatively, the UE may also be a roadside device, for example, it may be a street lamp, a signal lamp, or other roadside devices with a wireless communication function.

In an embodiment of the present disclosure, the network device may include a base station.

In an embodiment of the present disclosure, the method for receiving information indicated by the network device may include: receiving information sent by the network device through dedicated signaling. In another embodiment of the present disclosure, the method for receiving information indicated by the network device may include: receiving information broadcast by the network device.

And, in an embodiment of the present disclosure, the information indicated by the network device may specifically include at least the following situations.

Case 1: In an embodiment of the present disclosure, the information may only include: satellite ephemeris information.

Case 2: In an embodiment of the present disclosure, the information may only include: satellite cell reference location information.

In an embodiment of the present disclosure, the method for receiving the satellite cell reference location information indicated by the network device may include: the UE determining the satellite cell reference location information indicated by the network device according to a protocol. In another embodiment of the present disclosure, the method for receiving the satellite cell reference location information indicated by the network device may include: the UE receiving the satellite cell reference location information sent by the network device.

In an embodiment of the present disclosure, the method for the UE to receive the satellite cell reference location information sent by the network device may include: the network device carrying the satellite cell reference location information in the satellite ephemeris information, so that the UE receives the satellite cell reference location information carried in the satellite ephemeris information. In another embodiment of the present disclosure, the method for the UE to receive the satellite cell reference location information sent by the network device may include: the network device carrying the satellite cell reference location information in an Radio Resource Control (RRC) reconfiguration message, so that the UE receives the satellite cell reference location information carried in the RRC reconfiguration message. In yet another embodiment of the present disclosure, the method for the UE to receive the satellite cell reference location information sent by the network device may include: the network device carrying the satellite cell reference location information in CHO configuration information, so that the UE receives the satellite cell reference location information carried in the CHO configuration information.

Further, in an embodiment of the present disclosure, the satellite cell reference location information may include: the relative locational relationship between the satellite cell reference location and the corresponding satellite, and/or, the relative locational relationship between the satellite cell reference location and the sub-satellite point of the corresponding satellite; in an embodiment of the present disclosure, the satellite cell reference location may include a location of any reference point in the satellite cell. Exemplarily, in an embodiment of the present disclosure, the satellite cell reference location may include a location of a cell center point of the satellite cell.

And, in an embodiment of the present disclosure, the satellite cell in the satellite cell reference location information received by the UE may include at least one of the following: a serving satellite cell of the UE, a neighbor satellite cell of the serving satellite cell, a candidate satellite cell indicated in the CHO configuration information, or a satellite cell designated by other network device.

Exemplarily, in an embodiment of the present disclosure, the satellite cell reference location information received by the UE may be: reference location information of the serving satellite cell of the UE.

Exemplarily, in another embodiment of the present disclosure, the satellite cell reference location information received by the UE may be: reference location information of the neighbor satellite cell of the serving satellite cell of the UE.

Exemplarily, in another embodiment of the present disclosure, the satellite cell reference location information received by the UE may be: candidate satellite cell reference location information in the CHO configuration information of the UE.

Exemplarily, in another embodiment of the present disclosure, the satellite cell reference location information received by the UE may be: satellite cell reference location information designated by other network device.

Exemplarily, in an embodiment of the present disclosure, the satellite cell reference location information received by the UE may be: the reference location information of the serving satellite cell of the UE, and the reference location information of the neighbor satellite cell of the serving satellite cell of the UE.

Exemplarily, in an embodiment of the present disclosure, the satellite cell reference location information received by the UE may be: the reference location information of the serving satellite cell of the UE, and the candidate satellite cell reference location information in the CHO configuration information of the UE.

Exemplarily, in an embodiment of the present disclosure, the satellite cell reference location information received by the UE may be: the reference location information of the serving satellite cell of the UE, and the satellite cell reference location information designated by other network device.

Exemplarily, in an embodiment of the present disclosure, the satellite cell reference location information received by the UE may be: the reference location information of the neighbor satellite cell of the serving satellite cell of the UE, and the candidate satellite cell reference location information in the CHO configuration information of the UE.

Exemplarily, in an embodiment of the present disclosure, the satellite cell reference location information received by the UE may be: the reference location information of the neighbor satellite cell of the serving satellite cell of the UE, and the satellite cell reference location information designated by other network device.

Exemplarily, in one embodiment of the present disclosure, the satellite cell reference location information received by the UE may be: the candidate satellite cell reference location information in the CHO configuration information of the UE, and the satellite cell reference location information designated by other network device.

Exemplarily, in an embodiment of the present disclosure, the satellite cell reference location information received by the UE may be: the reference location information of the serving satellite cell of the UE, the reference location information of the neighbor satellite cell of the serving satellite cell of the UE, and the candidate satellite cell reference location information in the CHO configuration information of the UE.

Exemplarily, in an embodiment of the present disclosure, the satellite cell reference location information received by the UE may be: the reference location information of the serving satellite cell of the UE, the reference location information of the neighbour satellite cell of the serving satellite cell of the UE, and the satellite cell reference location information designated by other network device.

Exemplarily, in an embodiment of the present disclosure, the satellite cell reference location information received by the UE may be: the reference location information of the serving satellite cell of the UE, the candidate satellite cell reference location information in the CHO configuration information of the UE, and the satellite cell reference location information designated by other network device.

Exemplarily, in an embodiment of the present disclosure, the satellite cell reference location information received by the UE may be: the reference location information of the neighbour satellite cell of the serving satellite cell of the UE, the reference location information of the candidate satellite cell indicated in the CHO configuration information of the UE, and the satellite cell reference location information designated by other network device.

Exemplarily, in an embodiment of the present disclosure, the satellite cell reference location information received by the UE may be: the reference location information of the serving satellite cell of the UE, the reference location information of the neighbor satellite cell of the serving satellite cell of the UE, the candidate satellite cell reference location information in the CHO configuration information of the UE, and the satellite cell reference location information designated by other network device.

And, it should be noted that, in an embodiment of the present disclosure, the relative locational relationship between the satellite cell reference location and the corresponding satellite is relatively fixed, that is, when the satellite moves, the satellite cell reference location will move with the movement of the satellite. However, the relative locational relationship between the satellite cell reference location and the corresponding satellite will not move with the movement of the satellite.

And, it should be noted that, in an embodiment of the present disclosure, the relative locational relationship between the satellite cell reference location and the sub-satellite point of the corresponding satellite is relatively fixed. That is, when the satellite moves, the satellite cell reference location will move with the movement of the satellite, but the relative locational relationship between the satellite cell reference location and the sub-satellite point of the corresponding satellite will not move with the movement of the satellite.

Further, it should be noted that, in an embodiment of the present disclosure, the representation manner of the satellite cell reference location information may include at least one of the following:

- represented by a coordinate location of the satellite cell reference location in a coordinate system with the corresponding satellite as an origin;
- represented by a coordinate location of the satellite cell reference location in a coordinate system with the sub-satellite point of the corresponding satellite as an origin;
- represented by a distance between the satellite cell reference location and the corresponding satellite;
- represented by a distance between the satellite cell reference location and the sub-satellite point of the corresponding satellite;
- represented by an angle between the satellite cell reference location and the corresponding satellite;
- represented by an angle between the satellite cell reference location and the sub-satellite point of the corresponding satellite;
- represented by an azimuth between the satellite cell reference location and the corresponding satellite;
- represented by an azimuth between the satellite cell reference location and the sub-satellite point of the corresponding satellite;
- represented by a movement direction of the satellite;
- represented by a movement direction of the sub-satellite point of the satellite.

It should be noted that, in an embodiment of the present disclosure, the representation manner of the satellite cell reference location information may be any one of the foregoing representation manners. In another embodiment of the present disclosure, the representation manner of the satellite cell reference location information may be a combination of any two of the above representation manners, a combination of any three of the above representation manners, a combination of any four of the above representation manners, a combination of any five of the above representation manners, . . . , a combination of any nine of the above representation manners, or all ten of the above representation manners.

When the representation manner of the satellite cell reference location information is any one of the above representation manners, for example, in an embodiment of the present disclosure, the satellite cell reference location information may be represented by the coordinate location of the satellite cell reference location in the coordinate system with the sub-satellite point of the satellite as the origin.

For example, the satellite cell reference location information indicated by the network device received by the UE may be: the coordinate location of the satellite cell reference location in the coordinate system with the sub-satellite point as the origin is (100, 300), where the OX axis direction of the coordinate system may be the movement direction of the sub-satellite point, or may be the direction designated by other network device, or may be the direction specified by the protocol. Thus, the UE can determine the satellite cell reference location based on the above information, for example, can determine the longitude and latitude of the satellite cell reference location, and then can further determine the relative locational relationship between the UE and the satellite cell reference location.

And, when the representation manner of the satellite cell reference location information is a combination of any two of the above representation manners, for example, in an embodiment of the present disclosure, the satellite cell reference location information can be represented by the angle between the satellite cell reference location and the corresponding satellite and the azimuth of the satellite cell reference location and the sub-satellite point of corresponding satellite.

For example, the satellite cell reference location information indicated by the network device received by the UE may be: the elevation angle (or depression angle) between the satellite cell reference location and the corresponding satellite is 15°, and the azimuth between the satellite cell reference location and the sub-satellite point of the corresponding satellite is 30° east by north. Thus, the UE can determine the satellite cell reference location based on the above information, for example, can determine the longitude and latitude of the satellite cell reference location, and then can further determine the relative locational relationship between the UE and the satellite cell reference location.

Further, as another example, in another embodiment of the present disclosure, the satellite cell reference location information may be represented through the distance between the satellite cell reference location and the corresponding satellite and the azimuth between the satellite cell reference location and the sub-satellite point of the corresponding satellite location.

For example, the satellite cell reference location information indicated by the network device received by the LE may be: the distance between the satellite cell reference location and the corresponding satellite is 1500 meters, and the azimuth between the satellite cell reference location and the sub-satellite point of the corresponding satellite is 30° east by north. Thus, the UE can determine the satellite cell reference location based on the above information, for example, can determine the longitude and latitude of the satellite cell reference location, and then can further determine the relative locational relationship between the UE and the satellite cell reference location.

Case 3: In an embodiment of the present disclosure, the information may only include: the satellite identification corresponding to the satellite cell. For example, the satellite identification corresponding to the satellite cell may be: 01.

Case 4: In an embodiment of the present disclosure, the information may include: the satellite ephemeris information and the satellite cell reference location information.

Case 5: In an embodiment of the present disclosure, the information may include: the satellite cell reference location information, and the satellite identification corresponding to the satellite cell.

Case 6: In an embodiment of the present disclosure, the information may include: the satellite ephemeris information and the satellite identification corresponding to the satellite cell.

Case 7: In an embodiment of the present disclosure, the information may include: the satellite ephemeris information, the satellite cell reference location information, and the satellite identification corresponding to the satellite cell.

In step 102: a relative locational relationship between the UE and the satellite cell reference location is determined according to the information indicated by the network device.

FIG. 2 is a schematic flowchart of a method for determining a relative locational relationship between a UE and a satellite cell reference location provided by an embodiment of the present disclosure. As shown in FIG. 2, the method for determining the relative locational relationship between the UE and the satellite cell reference location according to the information indicated by the network device may include the following step.

In step 201, satellite cell reference location information is determined according to information indicated by the network device.

It should be noted that, when the content of the information indicated by the network device is different, the manner of determining the satellite cell reference location information is also different.

Specifically, in an embodiment of the present disclosure, when the information indicated by the network device includes the satellite cell reference location information (such as the above-mentioned case 2, case 4, case 5 or case 7), the satellite cell reference location information can be directly determined based on the information indicated by the network device.

And, in another embodiment of the present disclosure, when the satellite corresponds to only one satellite cell, the information indicated by the network device may not include the satellite cell reference location information, but include the satellite ephemeris information, and/or, the satellite identification corresponding to the satellite cell (for example, case 1, case 3, or case 6). At this time, the method for determining the satellite cell reference location information according to the information indicated by the network device may be as follows: in an embodiment of the present disclosure, when the information indicated by the network device includes the satellite ephemeris information (such as case 1 or case 6), the satellite cell reference location information can be determined according to the satellite ephemeris information. And, in another embodiment of the present disclosure, when the information indicated by the network device includes the satellite identification corresponding to the satellite cell, but does not include the satellite ephemeris information (for example, case 3), then the satellite ephemeris information can be determined according to the satellite identification corresponding to the satellite cell, and then the satellite cell reference location information is determined according to the satellite ephemeris information.

In step 202: a distance between the UE and the satellite cell reference location is determined according to the satellite cell reference location information.

In an embodiment of the present disclosure, determining the distance between the UE and the satellite cell reference location according to the satellite cell reference location information may be as follows: first obtaining the Global Positioning System (GPS) location of the LIE, and determining the relative locational relationship between the UE and the satellite cell reference location according to the GPS location of the UE and the satellite cell reference location information corresponding to the UE, and then determining the distance between the LIE and the satellite cell reference location according to the relative locational relationship between the UE and the satellite cell reference location.

And, in another embodiment of the present disclosure, determining the distance between the UE and the satellite cell reference location according to the satellite cell reference location information may be: the UE determining the GPS location of the satellite cell reference location according to the satellite cell reference location information, and acquiring the GPS location of the UE, and then determining the distance between the UE and the satellite cell reference location according to the GPS location of the UE and the GPS location of the satellite cell.

To sum up, in the method for indicating a location of a satellite cell provided by the embodiments of the present disclosure, the UE can receive the information indicated by the network device, and the information includes at least one of the following: satellite ephemeris information, satellite cell reference location information, or the satellite identification corresponding to the satellite cell; and, the UE may determine the relative locational relationship between the UE and the satellite cell reference location according to the information indicated by the network device, so that the CHO trigger condition based on the relative locational relationship between the UE and the satellite cell reference location can be introduced later. In the embodiment of the present disclosure, the satellite cell reference location information is: the relative locational relationship between the satellite cell reference location and the corresponding satellite, and/or, the relative locational relationship between the satellite cell reference location and the sub-satellite point of the corresponding satellite. And, since the satellite cell reference location information does not move with the movement of the satellite, the network device does not need to frequently update the satellite cell reference location information when performing cell handover based on location, thereby reducing signaling overhead.

FIG. 3 is a schematic flowchart of a method for indicating a location of a satellite cell provided by another embodiment of the present disclosure, which is performed by a UE. As shown in FIG. 3, the method for indicating a location of a satellite cell may include the following steps.

In step 301, information indicated by the network device is received, the information including at least one of the following: satellite ephemeris information, satellite cell reference location information, and a satellite identification corresponding to the satellite cell.

In step 302: the relative locational relationship between the UE and the satellite cell reference location is determined according to the information indicated by the network device.

For the detailed introduction of steps 301 to 302, reference may be made to the introduction in the first embodiment above, and details will not be described in the embodiments of the present disclosure.

In step 303: updated information indicated by the network device is received, where the updated information may include at least one of the following: updated satellite ephemeris information, updated satellite cell reference location information, and cell the satellite identification corresponding to the updated satellite cell.

It should be noted that, in an embodiment of the present disclosure, when the relevant information of the satellite cell changes (for example, the satellite ephemeris information expires, the deployment of the satellite cell changes, or the beam direction of the satellite cell changes, etc.), the relative locational relationship between the satellite cell reference location and the corresponding satellite, and the relative locational relationship between the satellite cell reference location and the sub-satellite point of the corresponding satellite will change. At this time, the network device needs to update the relevant information of the satellite cell, and may indicate the updated information to the UE according to the updated relevant information of the satellite cell.

Specifically, in an embodiment of the present disclosure, the network device may measure whether the satellite ephemeris information corresponding to the satellite cell changes, whether the deployment of the satellite cell changes, or whether the beam direction of the satellite cell changes. When any kind of information transmission changes, it is determined that the relevant information of the satellite cell changes. Then the network device may indicate the updated information to the UE.

Further, in an embodiment of the present disclosure, the received updated information may specifically include the following cases.

Case 8: In an embodiment of the present disclosure, the updated information may only include: updated satellite ephemeris information.

Case 9: In an embodiment of the present disclosure, the updated information may only include: updated satellite cell reference location information.

Case 10: In an embodiment of the present disclosure, the updated information may only include: the satellite identification corresponding to the updated satellite cell.

Case 11: In an embodiment of the present disclosure, the updated information may include: updated satellite ephemeris information, and updated satellite cell reference location information.

Case 12: In an embodiment of the present disclosure, the updated information may include: updated satellite cell reference location information, and satellite identification corresponding to the updated satellite cell.

Case 13: In an embodiment of the present disclosure, the updated information may include: updated satellite ephemeris information, and the satellite identification corresponding to the updated satellite cell.

Case 14: In an embodiment of the present disclosure, the updated information may include: updated satellite ephemeris information, updated satellite cell reference location information, and the satellite identification corresponding to the updated satellite cell.

In an embodiment of the present disclosure, the detailed introduction about the manner in which the UE receives the updated information indicated by the network device can refer to the above-mentioned first embodiment; the representation manner of the updated satellite cell reference location information is the same as the representation manner in the foregoing first embodiment, and details are not described in this embodiment of the present disclosure.

To sum up, in the method for indicating a location of a satellite cell provided by the embodiments of the present disclosure, the UE can receive the information indicated by the network device, and the information includes at least one of the following: satellite ephemeris information, satellite cell reference location information, or the satellite identification corresponding to the satellite cell; and, the UE may determine the relative locational relationship between the UE and the satellite cell reference location according to the information indicated by the network device, so as to subsequently introduce the CHO trigger condition based on the relative locational relationship between the UE and the satellite cell reference location. In the embodiments of the present disclosure, the satellite cell reference location information is: the relative locational relationship between the satellite cell reference location and the corresponding satellite, and/or, the relative location relationship between the satellite cell reference location and the sub-satellite point of the corresponding satellite. And, since the satellite cell reference location information does not move with the movement of the satellite, the network device does not need to frequently update the satellite cell reference location information when performing cell handover based on location, thereby reducing signaling overhead.

FIG. 4 is a schematic flowchart of a method for indicating a location of a satellite cell provided by another embodiment of the present disclosure, which is performed by a UE. As shown in FIG. 4, the method for indicating a location of a satellite cell may include the following steps.

In step 401: information indicated by the network device is received, the information including at least one of the following: satellite ephemeris information, satellite cell reference location information, or a satellite identification corresponding to the satellite cell.

In step 402: a relative locational relationship between the UE and the satellite cell reference location is determined according to the information indicated by the network device.

For the detailed introduction of steps 401 to 402, reference may be made to the introduction in the first embodiment above, and details will not be described in this embodiment of the present disclosure.

In step 403, a first trigger event configured by the network device is received.

In an embodiment of the present disclosure, the method for the UE to receive the first trigger event configured by the network device may include: receiving the first trigger event sent by the network device through dedicated signaling. In another embodiment of the present disclosure, the method for the UE to receive the first trigger event configured by the network device may include: receiving the first trigger event broadcast by the network device. In another embodiment of the present disclosure, the method for the UE to receive the first trigger event configured by the network device may include: the UE determining the first trigger event configured by the network device according to a protocol.

Further, in another embodiment of the present disclosure, the method for the UE to receive the first trigger event configured by the network device may include: the network device carrying the first trigger event in the satellite ephemeris information, so that the UE receives the first trigger event carried in the satellite ephemeris information. In another embodiment of the present disclosure, the method for the UE to receive the first trigger event configured by the network device may include: the network device carrying the first trigger event in the RRC reconfiguration message, so that the UE receives the first trigger event carried in the RRC reconfiguration message. In yet another embodiment of the present disclosure, the method for the UE to receive the first trigger event configured by the network device may include: the network device carrying the first trigger event in the CHO configuration information, so that the UE receives the first trigger event carried in the CHO configuration information.

And, in an embodiment of the present disclosure, the first trigger event may include at least one of: a new NR (new radio) measurement event, a trigger event based on the relative locational relationship between the IE and the satellite cell reference location, a trigger event based on a relative locational relationship between the UE and the satellite, or a time-based trigger event.

In an embodiment of the present disclosure, the first trigger event may specifically be the following cases:

Case 15: In an embodiment of the present disclosure, the first trigger event may only include: a new NR measurement event.

In an embodiment of the present disclosure, the new NR measurement event may include a radio resource management (RRM) event (such as A1-A6, B1, B2).

Case 16: In another embodiment of the present disclosure, the first trigger event may only include: a trigger event based on the relative locational relationship between the UE and the satellite cell reference location.

In an embodiment of the present disclosure, the relative locational relationship between the UE and the satellite cell reference location may include the distance between the UE and the satellite cell reference location.

Based on this, in an embodiment of the present disclosure, the trigger event based on the relative locational relationship between the UE and the satellite cell reference location may include: when the distance between the UE and the satellite cell reference location is greater than a first preset distance threshold, determining that the first trigger event occurs.

In another embodiment of the present disclosure, the trigger event based on the relative locational relationship between the UE and the satellite cell reference location may include: when the distance between the UE and the satellite cell reference location is less than a third preset distance threshold, determining that the first trigger event occurs.

Case 17: In another embodiment of the present disclosure, the first trigger event may only include: the trigger event based on the relative locational relationship between the UE and the satellite.

In an embodiment of the present disclosure, the relative locational relationship between the UE and the satellite may include the distance between the UE and the satellite.

Based on this, in an embodiment of the present disclosure, the trigger event based on the relative locational relationship between the UE and the satellite may include: when the distance between the UE and the satellite is greater than a second preset distance threshold, determining that the first trigger event occurs.

In another embodiment of the present disclosure, the trigger event based on the relative locational relationship between the UE and the satellite may include: when the distance between the UE and the satellite is less than a fourth preset distance threshold, determining that the first trigger event occurs.

It should be noted that, in an embodiment of the present disclosure, any two of, any three of, or all of the first preset distance threshold, the second preset distance threshold, the third preset distance threshold, and the fourth preset distance threshold may be the same. In an embodiment of the present disclosure, the first preset distance threshold, the second preset distance threshold, the third preset distance threshold, and the fourth preset distance threshold may all be different.

Case 18: In another embodiment of the present disclosure, the first trigger event may only include: the time-based trigger event.

In an embodiment of the present disclosure, the time-based trigger event may include a timer-based trigger event. In an embodiment of the present disclosure, the time-based trigger event may be, for example: when the timing reaches a preset time threshold, determining that the first trigger event occurs.

In another embodiment of the present disclosure, the time-based trigger event may include a Universal Time Coordinated (UTC) time-based trigger event. In an embodiment of the present disclosure, the UTC time-based trigger event may include: determining whether the first trigger event occurs according to the UTC time corresponding to the starting and termination moments of the visible arc segment of the satellite.

Exemplarily, in an embodiment of the present disclosure, if the current moment is the UTC time corresponding to the starting moment of the visible are segment of the satellite, it is determined that the first trigger event occurs. For example, in another embodiment of the present disclosure, if the current moment is the UTC time corresponding to the termination moment of the visible arc segment of the satellite, it is determined that the first trigger event occurs.

Case 19: In another embodiment of the present disclosure, the first trigger event may include: a new NR measurement event, and a trigger event based on the relative locational relationship between the UE and the satellite cell reference location.

Case 20: In another embodiment of the present disclosure, the first trigger event may include: a new NR measurement event, and a trigger event based on the relative locational relationship between the UE and the satellite.

Case 21: In another embodiment of the present disclosure, the first trigger event may include: a new NR measurement event and a time-based trigger event.

Case 22: In another embodiment of the present disclosure, the first trigger event may include: a trigger event based on the relative locational relationship between the UE and the satellite cell reference location, and a trigger event based on the relative locational relationship between the UE and the satellite event.

Case 23: in another embodiment of the present disclosure, the first trigger event may include: a trigger event based on the relative locational relationship between the UE and the satellite cell reference location, and a time-based trigger event.

Case 24: In another embodiment of the present disclosure, the first trigger event may include: a trigger event based on the relative locational relationship between the UE and the satellite, and a time-based trigger event.

Case 25: In another embodiment of the present disclosure, the first trigger event may include: a new NR measurement event, a trigger event based on the relative locational relationship between the UE and the satellite cell reference location, and a trigger event based on the relative locational relationship between the UE and the satellite.

Case 26: In another embodiment of the present disclosure, the first trigger event may include: a new NR measurement event, a trigger event based on the relative locational relationship between the UE and the satellite cell reference location, and a time-based trigger event.

Case 27: In another embodiment of the present disclosure, the first trigger event may include: a new NR measurement event, a trigger event based on the relative locational relationship between the UE and the satellite, and a time-based trigger event.

Case 28: In another embodiment of the present disclosure, the first trigger event may include: a trigger event based on the relative locational relationship between the UE and the satellite cell reference location, a trigger event based on the relative locational relationship between the UE and the satellite, and a time-based trigger event.

Case 29: In another embodiment of the present disclosure, the first trigger event may include: a new NR measurement event, a trigger event based on the relative locational relationship between the UE and the satellite cell reference location, a trigger event based on the relative locational relationship between the UE and the satellite, and a time-based trigger event.

In step 404, a measurement is started to obtain a measurement result.

In an embodiment of the present disclosure, after receiving the first trigger event configured by the network device, the UE may start the measurement according to the first trigger event and obtain a corresponding measurement result.

In an embodiment of the present disclosure, when the first trigger event is different, the measurement process is also different.

Specifically, in an embodiment of the present disclosure, when the first trigger event includes: the new NR measurement event, the measurement process may be: measuring whether a new NR measurement event occurs.

In another embodiment of the present disclosure, when the first trigger event includes: the trigger event based on a relative locational relationship between the UE and the satellite cell reference location, the measurement process may be: measuring the distance between the UE and the satellite cell.

In another embodiment of the present disclosure, when the first trigger event includes: the trigger event based on the relative locational relationship between the UE and the satellite, the measurement process may be: measuring the distance between the UE and the satellite.

In another embodiment of the present disclosure, when the first trigger event includes: the time-based trigger event, the measurement process may be: measuring timing of a timer or UTC time.

In step 405: it is determined whether the first trigger event occurs to obtain a determination result, where the determination result is used to indicate whether the first trigger event occurs to the UE.

In an embodiment of the present disclosure, the UE may determine whether the first trigger event occurs according to the measurement result in step 404.

It should be noted that, in an embodiment of the present disclosure, when the first trigger event includes the new NR measurement event, and the measurement result is: a new NR measurement event occurs, then it is determined that the first trigger event occurs; otherwise, it is determined that the first trigger event has not occurred.

In an embodiment of the present disclosure, the first trigger event includes a trigger event based on the relative locational relationship between the UE and the satellite cell reference location, and the measurement result is: the distance between the UE and the satellite cell reference location is greater than the first preset distance threshold or less than the third preset distance threshold, then it is determined that the first trigger event occurs; otherwise, it is determined that the first trigger event has not occurred.

In another embodiment of the present disclosure, when the first trigger event includes a trigger event based on the relative locational relationship between the UE and the satellite, and the measurement result is: the distance between the UE and the satellite cell reference location is greater than the second preset distance threshold or less than the fourth preset distance threshold, then it is determined that the first trigger event occurs; otherwise, it is determined that the first trigger event has not occurred.

In another embodiment of the present disclosure, when the first trigger event includes a time-based trigger event, and the measurement result is: the timing of the timer reaches the preset time threshold or the current moment is the UTC time corresponding to the starting moment of the visible arc segment of the satellite or the current moment is the UTC time corresponding to the termination moment of the visible are segment of the satellite, then it is determined that the first trigger event occurs; otherwise, it is determined that the first trigger event has not occurred.

In addition, it should be noted that, in an embodiment of the present disclosure, when the first trigger event includes two or more events (for example, any one of Case 19 to Case 29), then, when any one event of the first trigger events occurs, it is determined that the first trigger event occurs; otherwise, it is determined that the first trigger event has not occurred.

Exemplarily, in an embodiment of the present disclosure, when the first trigger event includes: a trigger event based on a relative locational relationship between the UE and the satellite cell reference location, and a trigger event based on the relative locational relationship between the UE and the satellite, then, when the distance between the UE and the satellite cell reference location is greater than the first preset distance threshold, or the distance between the UE and the satellite is greater than the second preset distance threshold, it is determined that the first trigger event occurs; otherwise, it is determined that the first trigger event has not occurred.

In step 406, the determination result is sent to the network device.

In step 407: the updated information indicated by the network device according to the determination result is received, where the updated information includes at least one of the following: updated satellite ephemeris information, updated satellite cell reference location information, and the satellite identification corresponding to the updated satellite cell.

In an embodiment of the present disclosure, when the network device receives the determination result sent by the UE, it may indicate the updated information according to the determination result. In an embodiment of the present disclosure, the method for the network device to indicate the updated information according to the determination result may include: when the determination result indicates that the first trigger event occurs to the UE, indicating the updated information to the UE, and when the determination result indicates that the first trigger event does not occur to the UE, not indicating the updated information to the UE.

For the detailed introduction of the updated information in step 407, reference may be made to step 303 in the third embodiment above, and details will not be described in this embodiment of the present disclosure.

To sum up, in the method for indicating a location of a satellite cell provided by the embodiments of the present disclosure, the UE can receive the information indicated by the network device, and the information includes at least one of the following: satellite ephemeris information, satellite cell reference location information, or the satellite identification corresponding to the satellite cell; and, the UE may determine the relative locational relationship between the UE and the satellite cell reference location according to the information indicated by the network device, so that the CHO trigger condition based on the relative locational relationship between the UE and the satellite cell reference location can be introduced later. In the embodiments of the present disclosure, the satellite cell reference location information is: the relative locational relationship between the satellite cell reference location and the corresponding satellite, and/or, the relative locational relationship between the satellite cell reference location and the sub-satellite point of the corresponding satellite. And, since the satellite cell reference location information does not move with the movement of the satellite, the network device does not need to frequently update the satellite cell reference location information when performing cell handover based on location, thereby reducing signaling overhead.

Figures 5, 6, 7:
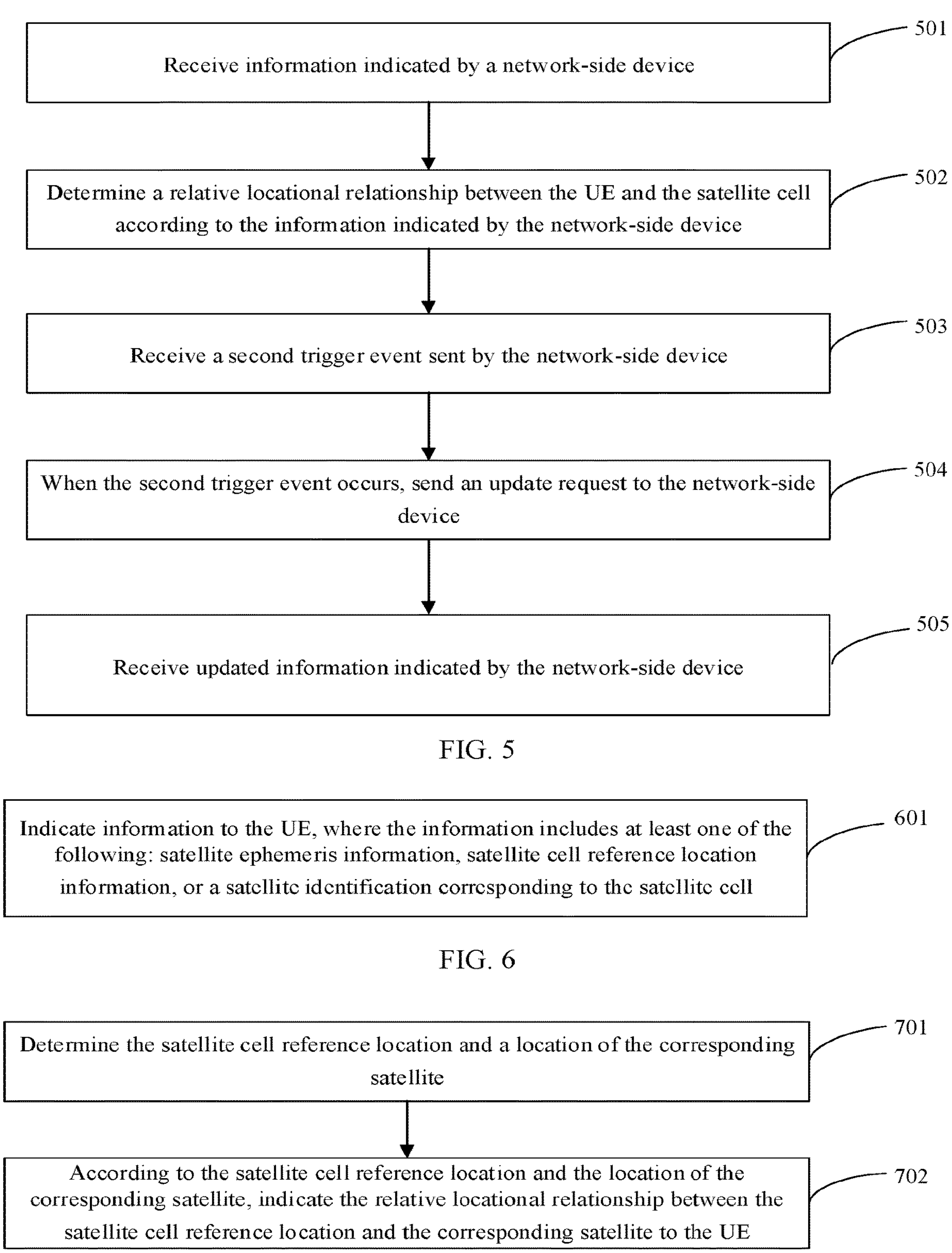
FIG. 5 is a schematic flowchart of a method for indicating a location of a satellite cell provided by another embodiment of the present disclosure.
FIG. 6 is a schematic flowchart of a method for indicating a location of a satellite cell provided by another embodiment of the present disclosure.
FIG. 7 is a schematic flowchart of a method for indicating to UE a relative locational relationship between a satellite cell reference location and a corresponding satellite provided by another embodiment of the present disclosure.

FIG. 5 is a schematic flowchart of a method for indicating a location of a satellite cell provided by another embodiment of the present disclosure, which is performed by a UE. As shown in FIG. 5, the method for indicating a location of a satellite cell may include the following steps.

In step 501: information indicated by the network device is received, where the information includes at least one of the following: satellite ephemeris information, satellite cell reference location information, and a satellite identification corresponding to the satellite cell.

In step 502: a relative locational relationship between the UE and the satellite cell is determined according to the information indicated by the network device.

For the detailed introduction of steps 501 to 502, reference may be made to the introduction in the first embodiment above, and details will not be described in this embodiment of the present disclosure.

In step 503: a second trigger event sent by the network device is received.

In an embodiment of the present disclosure, the second trigger event may include at least one of: a new NR measurement event, a trigger event based on the relative locational relationship between the UE and the satellite cell reference location, a trigger event based on the relative locational relationship between the LE and the satellite, or a time-based trigger event.

In an embodiment of the present disclosure, for a detailed introduction about the method for the UE to receive the second trigger event configured by the network device, reference may be made to the relevant introduction to the first trigger event in step 403 of the fourth embodiment above; and, for a detailed introduction about all cases of the second trigger event, reference may be made to the Case 15 to the Case 29 of the first trigger event in the fourth embodiment above, which will not be repeated in this embodiment of the disclosure.

In step 504, when the second trigger event occurs, an update request is sent to the network device.

In an embodiment of the present disclosure, for a detailed introduction about the manner in which the UE determines whether the second trigger event occurs, reference may be made to the relevant introduction to the first trigger event in step 405 in the fourth embodiment above, which will not be repeated in this embodiment of the disclosure.

In step 505: the updated information indicated by the network device is received, where the updated information includes at least one of the following: updated satellite ephemeris information, updated satellite cell reference location information, and a satellite identification corresponding to the updated satellite cell.

For a detailed introduction of step 505, reference may be made to the introduction of step 303 in the third embodiment above, and details are not described here in this embodiment of the present disclosure.

To sum up, in the method for indicating a location of a satellite cell provided by the embodiments of the present disclosure, the UE can receive the information indicated by the network device, and the information includes at least one of the following: satellite ephemeris information, satellite cell reference location information, or the satellite identification corresponding to the satellite cell; and, the UE may determine the relative locational relationship between the UE and the satellite cell reference location according to the information indicated by the network device, so that the CHO trigger based on the relative locational relationship between the UE and the satellite cell reference location can be introduced later condition. In the embodiments of the present disclosure, the satellite cell reference location information is: the relative locational relationship between the satellite cell reference location and the corresponding satellite, and/or, the relative locational relationship between the satellite cell reference location and the sub-satellite point of the corresponding satellite. And, since the satellite cell reference location information does not move with the movement of the satellite, the network device does not need to frequently update the satellite cell reference location information when performing cell handover based on location, thereby reducing signaling overhead.

FIG. 6 is a schematic flowchart of a method for indicating a location of a satellite cell provided by another embodiment of the present disclosure, which is performed by a network device. As shown in FIG. 6, the method for indicating a location of a satellite cell may include the following steps.

In step 601: information is indicated to the UE, where the information includes at least one of the following: satellite ephemeris information, satellite cell reference location information, or a satellite identification corresponding to the satellite cell.

In an embodiment of the present disclosure, for a detailed introduction of specific situation of the information, reference may be made to the first embodiment above, and details will not be described in this embodiment of the present disclosure.

As described above, in an embodiment of the present disclosure, the satellite cell reference location information includes: the relative locational relationship between the satellite cell reference location and the corresponding satellite, and/or, the relative locational relationship between the satellite cell reference location and the sub-satellite point of the corresponding satellite.

And, in an embodiment of the present disclosure, in step 601, the method for the network device to indicate to the UE the relative locational relationship between the satellite cell reference location and the corresponding satellite may be as shown in FIG. 7, and includes the following steps.

In step 701, the satellite cell reference location and a location of the corresponding satellite are determined.

In an embodiment of the present disclosure, the method for determining the satellite cell reference location may include: determining a coordinate location corresponding to the satellite cell reference location at each moment in the Earth-Centered Earth-Fixed (ECEF) coordinate system according to the velocity vector of movement of the satellite cell reference location, and then determining the satellite cell reference location. For example, according to the location of the satellite cell reference location in the ECEF coordinate system at a given moment, and the velocity vector of the motion direction of the satellite cell reference location in the ECEF coordinate system, the location of the satellite cell reference location at each moment in the ECEF coordinate system can be determined.

In an embodiment of the present disclosure, when determining the location of the satellite cell reference location in the ECEF coordinate system according to the velocity vector of the satellite cell reference location, it is mainly determined according to the satellite ephemeris information, and the specific method may include the following; the main representation form of the satellite ephemeris information is represented by True Equator Mean Equinox (TEME), on this basis, based on the TLE data represented by TEME, the location of the satellite revolving around the earth in TEME may be calculated by using Simplified General Perturbations (SGP4), and then the location of the satellite cell reference location in TEME is determined according to the location of the satellite in TEME, and the location of the satellite cell reference location in TEME is converted into the location coordinate of the satellite cell reference location in the ECEF coordinate system, and then, combined with the velocity vector of the movement of the satellite cell reference location, the location coordinate of the satellite cell reference location in the ECEF coordinate system at each moment can be determined, thereby representing the location of the satellite cell reference location.

And, in an embodiment of the present disclosure, the method for determining the location of the corresponding satellite may include: determining the location of the satellite according to the satellite ephemeris information. In an embodiment of the present disclosure, the satellite ephemeris information may include parameter information of the satellite, for example including: the orbital plane parameters: the square root of the semi major axis (semi-major axis), eccentricity, inclination angle at the reference time, the longitude of the ascending node of the orbit plane, and the argument of perigee; the satellite level parameters: the mean anomaly at the reference time and the ephemeris reference time. The network device can determine the location of the satellite according to the above-mentioned parameter information of the satellite.

Further, in another embodiment of the present disclosure, the method for determining the location of the corresponding satellite may only include: determining the location of the satellite in the ECEF coordinate system according to the velocity vector of the satellite. For example, the location of the satellite in the ECEF coordinate system at each moment can be determined according to the location of the satellite in the ECEF coordinate system at a given moment and the velocity vector of the motion direction of the satellite in the ECEF coordinate system.

In an embodiment of the present disclosure, when the location of the satellite is determined in the ECEF coordinate system according to the velocity vector of the satellite, it is mainly determined according to the satellite ephemeris information, and the specific method may include the following: the main representation form of the satellite ephemeris information is: being represented by TEME, on this basis, based on the TLE data represented by TEME, the location of the satellite revolving around the earth in TEME can be calculated by using SGP4, and then the location of the satellite in TEME is converted into the location coordinate of the satellite in the ECEF coordinate system, and combined with the velocity vector of the movement of the satellite, the location coordinate of the satellite in the ECEF coordinate system at each moment can be determined, thereby representing the location of the satellite.

In step 702: according to the satellite cell reference location and the location of the corresponding satellite, the relative locational relationship between the satellite cell reference location and the corresponding satellite is indicated to the UE.

In an embodiment of the present disclosure, the representation manner of the relative locational relationship between the satellite cell reference location and the corresponding satellite can refer to the description of the representation manner of the satellite cell reference location information in the first embodiment above, which is not elaborated in the embodiment of the present disclosure.

Figure 8:
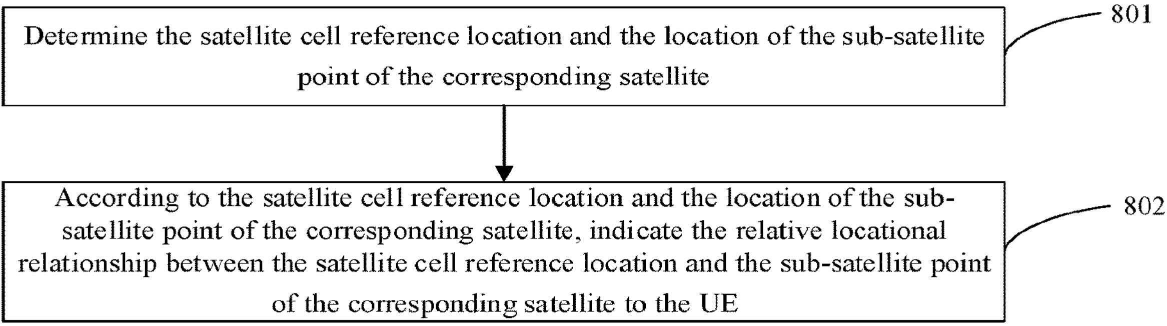
FIG. 8 is a schematic flowchart of a method for indicating to UE a relative locational relationship between a satellite cell reference location and a sub-satellite point of a corresponding satellite provided by another embodiment of the present disclosure.

Further, in yet another embodiment of the present disclosure, in step 601, the method for the network device to indicate to the UE the relative locational relationship between the satellite cell reference location and the sub-satellite point of the corresponding satellite may be as shown in FIG. 8, and includes the following steps.

In step 801, the satellite cell reference location and the location of the sub-satellite point of the corresponding satellite are determined.

In an embodiment of the present disclosure, the method for the network device to determine the location of the sub-satellite point may include at least one of: determining according to the track of the sub-satellite point, determining according to the velocity vector of the sub-satellite point of the satellite in the ECEF coordinate system, or determining according to the satellite ephemeris information.

In an embodiment of the present disclosure, the method for the network device to determine the location of the sub-satellite point of the satellite may only include: determining the location of the sub-satellite point of the satellite according to the track of the sub-satellite point.

In an embodiment of the present disclosure, the track of the sub-satellite point may be determined based on the satellite ephemeris information (i.e., Two-Line Element (TLE)). And, the track of the sub-satellite point may specifically be a movement track of the sub-satellite point of the satellite, that is, indicating the location of the sub-satellite point of the satellite at each moment. Thus, the location of the sub-satellite point of the satellite can be directly determined according to the track of the sub-satellite point.

In another embodiment of the present disclosure, the method for the network device to determine the location of the sub-satellite point of the satellite may only include: determining the location of the sub-satellite point of the satellite in the ECEF coordinate system according to the velocity vector of the sub-satellite point of the satellite.

In an embodiment of the present disclosure, when determining the location of the sub-satellite point of the satellite in the ECEF coordinate system according to the velocity vector of the sub-satellite point of the satellite, it is mainly determined according to the satellite ephemeris information, and the specific method may include the following: the main representation form of the satellite ephemeris information is: being represented by TEME, on this basis, based on the TLE data represented by TEME, the location of the sub-satellite point of the satellite revolving around the earth in TEME can be calculated by using SGP4, and then the location of the sub-satellite point of the satellite in TEME is converted into the location coordinate of the sub-satellite point of the satellite in the ECEF coordinate system, and, combined with the velocity vector of the movement of the sub-satellite point of the satellite, the location coordinate of the sub-satellite point of the satellite in the ECEF coordinate system at each moment can be determined, thereby representing the location of the sub-satellite point of the satellite.

In another embodiment of the present disclosure, the method for the network device to determine the location of the sub-satellite point of the satellite may only include: determining the location of the sub-satellite point of the satellite according to the satellite ephemeris information.

In another embodiment of the present disclosure, the method for determining the location of the sub-satellite point of the satellite according to the satellite ephemeris information may include: determining the location of the satellite according to the parameter information of the satellite included in the satellite ephemeris information.

In another embodiment of the present disclosure, the method for the network device to determine the location of the sub-satellite point may include: determining according to the track of the sub-satellite point and determining in the ECEF coordinate system according to the velocity vector of the sub-satellite point of the satellite.

In another embodiment of the present disclosure, the method for the network device to determine the location of the sub-satellite point of the satellite may include: determining in the ECEF coordinate system according to the velocity vector of the sub-satellite point of the satellite and determining according to the satellite ephemeris information.

In another embodiment of the present disclosure, the method for the network device to determine the location of the sub-satellite point may include: determining according to the track of the sub-satellite point and determining according to the satellite ephemeris information.

In another embodiment of the present disclosure, the method for the network device to determine the location of the sub-satellite point of the satellite may include: determining according to the track of the sub-satellite point, determining according to the track of the sub-satellite point and determining in the ECEF coordinate system according to the velocity vector of the sub-satellite point of the satellite and determining according to the satellite ephemeris information.

In step 802: according to the satellite cell reference location and the location of the sub-satellite point of the corresponding satellite, the relative locational relationship between the satellite cell reference location and the sub-satellite point of the corresponding satellite is indicated to the UE.

In an embodiment of the present disclosure, the representation manner of the relative locational relationship between the satellite cell reference location and the sub-satellite point of the corresponding satellite can refer to the description of the representation manner of the satellite cell reference location information in the first embodiment above, which is not elaborated in the embodiments of the present disclosure.

To sum up, in the method for indicating a location of a satellite cell provided by the embodiments of the present disclosure, the UE can receive the information indicated by the network device, and the information includes at least one of the following: satellite ephemeris information, satellite cell reference location information, or the satellite identification corresponding to the satellite cell; and, the UE may determine the relative locational relationship between the UE and the satellite cell reference location according to the information indicated by the network device, so that the CHO trigger condition based on the relative locational relationship between the UE and the satellite cell reference location can be introduced later. In the embodiments of the present disclosure, the satellite cell reference location information is: the relative locational relationship between the satellite cell reference location and the corresponding satellite, and/or, the relative locational relationship between the satellite cell reference location and the sub-satellite point of the corresponding satellite. And, since the satellite cell reference location information does not move with the movement of the satellite, the network device does not need to frequently update the satellite cell reference location information when performing cell handover based on location, thereby reducing signaling overhead.

Figure 9:
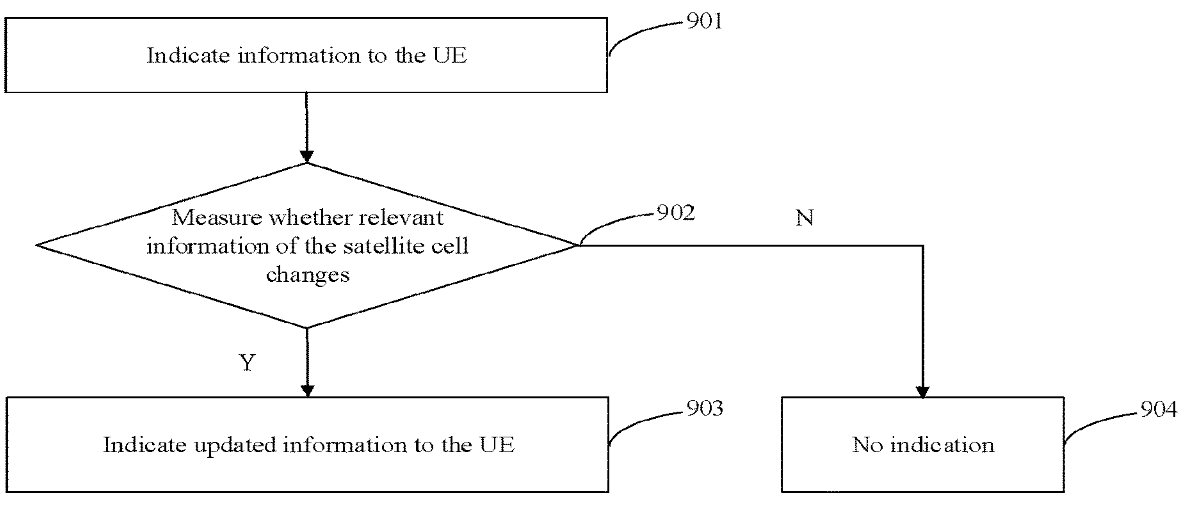
FIG. 9 is a schematic flowchart of a method for indicating a location of a satellite cell provided by another embodiment of the present disclosure.

FIG. 9 is a schematic flowchart of a method for indicating a location of a satellite cell provided by another embodiment of the present disclosure, which is performed by a network device. As shown in FIG. 9, the method for indicating a location of a satellite cell may include the following steps.

In step 901: information is indicated to the UE, where the information includes at least one of the following: satellite ephemeris information, satellite cell reference location information, and a satellite identification corresponding to the satellite cell.

For a detailed introduction of step 901, reference may be made to the introduction in the sixth embodiment above, and details are not described in this embodiment of the present disclosure.

In step 902, it is measured whether relevant information of the satellite cell changes.

In an embodiment of the present disclosure, the relevant information of the satellite cell may include satellite ephemeris information corresponding to the satellite cell, deployment of the satellite cell, a beam direction of the satellite cell, and the like.

And, in an embodiment of the present disclosure, when any information in the relevant information of the satellite cell changes, it is determined that the relevant information of the satellite cell changes. For example, when the network device measures that the satellite ephemeris information corresponding to the satellite cell expires, it determines that the relevant information of the satellite cell has changed, or when the network device measures that the beam direction of the satellite cell changes, it determines that the relevant information of the satellite cell has changed.

Further, when the network device measures that the relevant information of the satellite cell changes, step 903 is continued to be performed; otherwise, step 904 is performed.

In step 903: updated information is indicated to the UE, where the updated information includes at least one of the following: the updated satellite ephemeris information, the updated satellite cell reference location information, or the satellite identification corresponding to the updated satellite cell.

For the detailed introduction of step 903, reference may be made to the introduction of step 303 in the third embodiment above, and details are not described in this embodiment of the present disclosure.

In step 904, no indication is given.

To sum up, in the method for indicating a location of a satellite cell provided by the embodiments of the present disclosure, the UE can receive the information indicated by the network device, and the information includes at least one of the following: satellite ephemeris information, satellite cell reference location information, or the satellite identification corresponding to the satellite cell; and, the UE may determine the relative locational relationship between the UE and the satellite cell reference location according to the information indicated by the network device, so that the CHO trigger condition based on the relative locational relationship between the UE and the satellite cell reference location can be introduced later. In the embodiments of the present disclosure, the satellite cell reference location information is: the relative locational relationship between the satellite cell reference location and the corresponding satellite, and/or, the relative locational relationship between the satellite cell reference location and the sub-satellite point of the corresponding satellite. And, since the satellite cell reference location information does not move with the movement of the satellite, the network device does not need to frequently update the satellite cell reference location information when performing cell handover based on location, thereby reducing signaling overhead.

FIG. 10 is a schematic flowchart of a method for indicating a location of a satellite cell provided by another embodiment of the present disclosure, which is performed by network device. As shown in FIG. 10, the method for indicating a location of a satellite cell may include the following steps.

In step 1001: information is indicated to the UE, where the information including at least one of the following: satellite ephemeris information, satellite cell reference location information, or a satellite identification corresponding to the satellite cell.

For the detailed introduction of step 1001, reference may be made to the introduction in the sixth embodiment above, and details are not described here in this embodiment of the present disclosure.

In step 1002, a first trigger event is configured for the UE.

In an embodiment of the present disclosure, the first trigger event may include at least one of a new NR measurement event, a trigger event based on the relative locational relationship between the UE and the satellite cell reference location, a trigger event based on the relative locational relationship between the UE and the satellite, or a time-based trigger event.

And, for a detailed introduction about the first trigger event, reference may be made to the introduction in the fourth embodiment above, and details will not be repeated here in this embodiment of the present disclosure.

In step 1003, the determination result sent by the UE is received.

In step 1004, when the determination result indicates that the first trigger event occurs, updated information is indicated to the UE, where the updated information includes at least one of the following: updated satellite ephemeris information, updated satellite cell reference location information, or the satellite identification corresponding to the updated satellite cell.

For a detailed introduction of step 1004, reference may be made to step 303 in the third embodiment above, and details are not described here in this embodiment of the present disclosure.

To sum up, in the method for indicating a location of a satellite cell provided by the embodiments of the present disclosure, the UE can receive the information indicated by the network device, and the information includes at least one of the following: satellite ephemeris information, satellite cell reference location information, or the satellite identification corresponding to the satellite cell; and, the UE may determine the relative locational relationship between the UE and the satellite cell reference location according to the information indicated by the network device, so that the CHO trigger condition based on the relative locational relationship between the UE and the satellite cell reference location can be introduced later. In the embodiments of the present disclosure, the satellite cell reference location information is: the relative locational relationship between the satellite cell reference location and the corresponding satellite, and/or, the relative locational relationship between the satellite cell reference location and the sub-satellite point of the corresponding satellite. And, since the satellite cell reference location information does not move with the movement of the satellite, the network device does not need to frequently update the satellite cell reference location information when performing cell handover based on location, thereby reducing signaling overhead.

Figure 11:
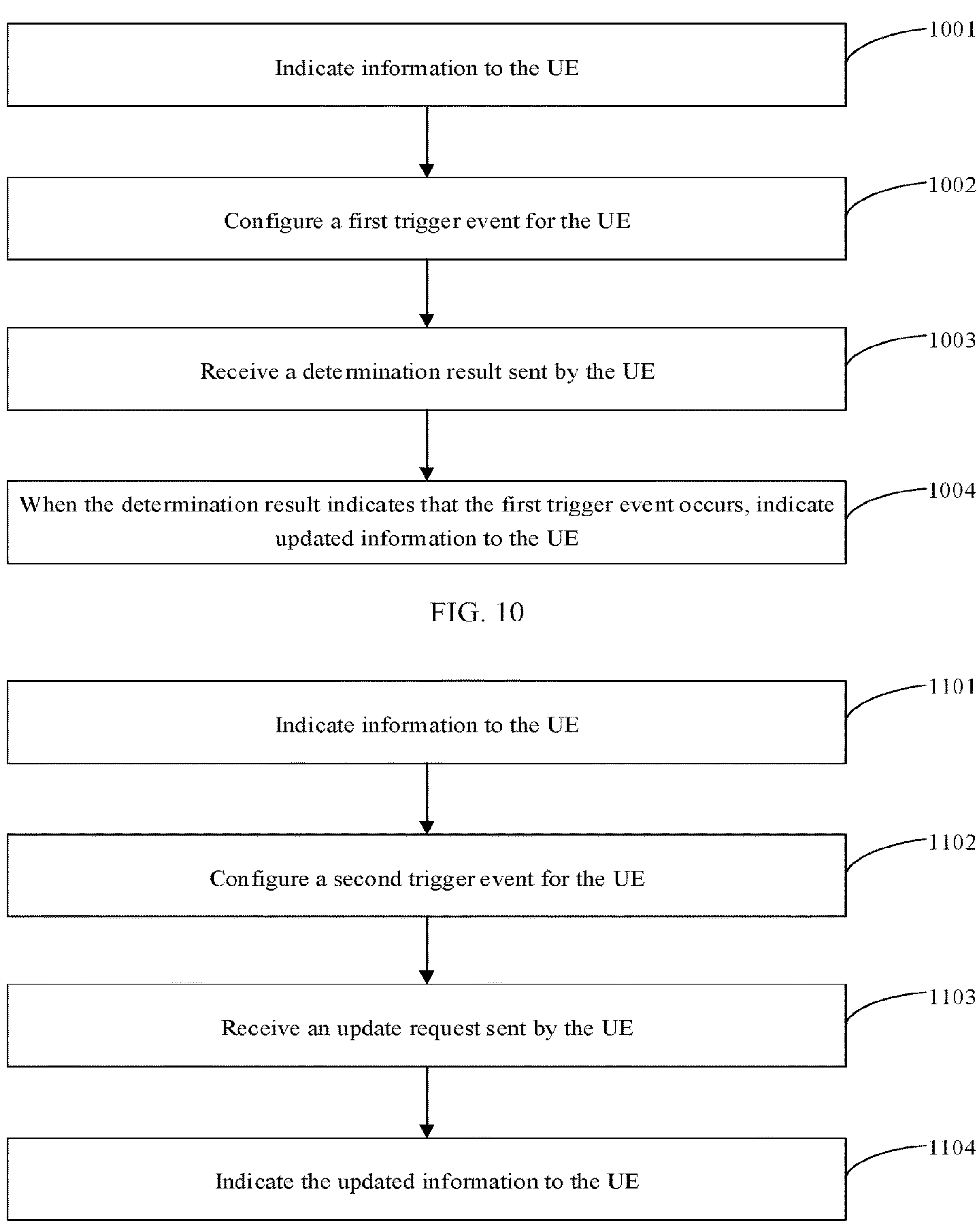
FIG. 11 is a schematic flowchart of a method for indicating a location of a satellite cell provided by another embodiment of the present disclosure.

FIG. 11 is a schematic flowchart of a method for indicating a location of a satellite cell provided by another embodiment of the present disclosure, which is performed by a network device. As shown in FIG. 11, the method for indicating a location of a satellite cell may include the following steps.

In step 1101, information is indicated to the UE, where the information includes at least one of the following: satellite ephemeris information, satellite cell reference location information, or a satellite identification corresponding to the satellite cell.

For the detailed introduction of step 1101, reference may be made to the introduction in the sixth embodiment above, and details are not described in this embodiment of the present disclosure.

In step 1102, a second trigger event is sent to the UE.

For a detailed introduction about the second trigger event, reference may be made to the introduction in the fifth embodiment above, and details will not be described in this embodiment of the present disclosure.

In step 1103, an update request sent by the UE is received.

In step 1104, the updated information is indicated to the UE, where the updated information includes at least one of the following: updated satellite ephemeris information, updated satellite cell reference location information, or a satellite identification corresponding to the updated satellite cell.

For a detailed introduction of step 1104, reference may be made to step 303 in the third embodiment above, and details are not described in this embodiment of the present disclosure.

To sum up, in the method for indicating a location of a satellite cell provided by the embodiments of the present disclosure, the UE can receive the information indicated by the network device, and the information includes at least one of the following: satellite ephemeris information, satellite cell reference location information, or the satellite identification corresponding to the satellite cell: and, the UE may determine the relative locational relationship between the UE and the satellite cell reference location according to the information indicated by the network device, so that the CHO trigger condition based on the relative locational relationship between the UE and the satellite cell reference location can be introduced later. In the embodiments of the present disclosure, the satellite cell reference location information is: the relative locational relationship between the satellite cell reference location and the corresponding satellite, and/or, the relative locational relationship between the satellite cell reference location and the sub-satellite point of the corresponding satellite. And, since the satellite cell reference location information does not move with the movement of the satellite, the network device does not need to frequently update the satellite cell reference location information when performing cell handover based on location, thereby reducing signaling overhead.

Figure 12:
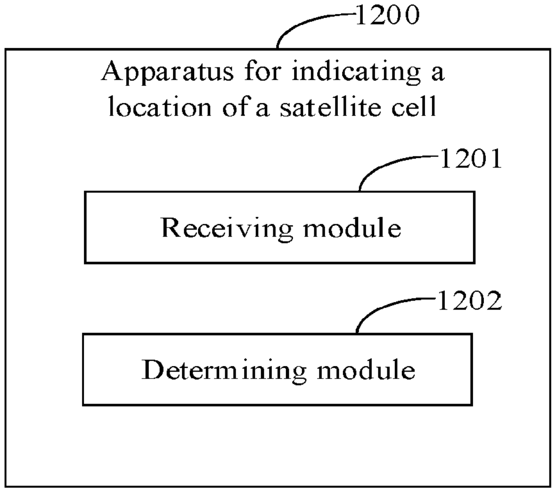
FIG. 12 is a schematic structural diagram of an apparatus for indicating a location of a satellite cell provided by an embodiment of the present disclosure.

FIG. 12 is a schematic structural diagram of an apparatus for indicating a location of a satellite cell provided by an embodiment of the present disclosure. As shown in FIG. 12, the apparatus 1200 may include:

- a receiving module 1201, configured to receive information indicated by a network device, the information including at least one of the following: satellite ephemeris information, satellite cell reference location information, or a satellite identification corresponding to the satellite cell;
- a determining module 1202, configured to determine a relative locational relationship between the UE and the satellite cell reference location according to the information indicated by the network device.

To sum up, in the apparatus for indicating a location of a satellite cell provided by the embodiments of the present disclosure, the UE can receive information indicated by the network device, and the information includes at least one of the following: satellite ephemeris information, satellite cell reference location information, or the satellite identification corresponding to the satellite cell; and, the UE may determine the relative locational relationship between the UE and the satellite cell reference location according to the information indicated by the network device, so that the CHO trigger condition based on the relative locational relationship between the UE and the satellite cell reference location can be introduced later. In the embodiments of the present disclosure, the satellite cell reference location information is: the relative locational relationship between the satellite cell reference location and the corresponding satellite, and/or, the relative locational relationship between the satellite cell reference location and the sub-satellite point of the corresponding satellite. And, since the satellite cell reference location information does not move with the movement of the satellite, the network device does not need to frequently update the satellite cell reference location information when performing cell handover based on location, thereby reducing signaling overhead.

In an embodiment of the present disclosure, the satellite cell reference location information includes a relative locational relationship between the satellite cell reference location and the corresponding satellite, and/or a relative locational relationship between the satellite cell reference location and the sub-satellite point of the corresponding satellite. The satellite cell reference location includes a location of any reference point in the satellite cell.

Further, in another embodiment of the present disclosure, the satellite cell reference location includes a location of a cell center point of the satellite cell.

Further, in another embodiment of the present disclosure, the above-mentioned receiving module 1201 is further configured to determine the satellite cell reference location information indicated by the network device according to a protocol.

Further, in another embodiment of the present disclosure, the receiving module 1201 is further configured to receive the satellite cell reference location information sent by the network device.

Further, in another embodiment of the present disclosure, the receiving module 1201 is further configured to receive the satellite cell reference location information carried in the satellite ephemeris information.

Further, in another embodiment of the present disclosure, the receiving module 1201 is further configured to receive the cell reference location information carried in an RRC reconfiguration message.

Further, in another embodiment of the present disclosure, the receiving module 1201 is further configured to receive the satellite cell reference location information carried in a conditional handover (CHO) configuration information.

Further, in another embodiment of the present disclosure, the satellite cell includes at least one of the following: a serving satellite cell of the UE, a neighbour satellite cell of the serving satellite cell, a candidate satellite cell indicated in CHO configuration information, and a satellite cell designated by other network device.

Further, in another embodiment of the present disclosure, the representation manner of the satellite cell reference location information includes at least one of the following:

- represented by a coordinate location of the satellite cell reference location in a coordinate system with the satellite as an origin;
- represented by a coordinate location of the satellite cell reference location in a coordinate system with the satellite sub-satellite point as an origin;

represented by a distance between the satellite cell reference location and the satellite;

represented by a distance between the satellite cell reference location and the sub-satellite point of the satellite;

represented by an angle between the satellite cell reference location and the satellite;

represented by an angle between the satellite cell reference location and the sub-satellite point of the satellite;

represented by an azimuth between the satellite cell reference location and the satellite;

represented by the azimuth between the satellite cell reference location and the sub-satellite point of the satellite;

represented by a movement direction of the satellite;

represented by a movement direction of the sub-satellite point of the satellite.

Further, in another embodiment of the present disclosure, the above-mentioned apparatus is further configured to receive updated information indicated by the network device, where the updated information includes at least one of the following: updated satellite ephemeris information, updated satellite cell reference location information, or a satellite identification corresponding to updated satellite cell.

Further, in another embodiment of the present disclosure, the above-mentioned apparatus is further configured to:

receive a first trigger event configured by the network device;

start a measurement to obtain a measurement result;

determine whether the first trigger event occurs to obtain a determination result;

send the determination result to the network device;

receive updated information indicated by the network device according to the determination result, where the updated information includes at least one of the following: updated satellite ephemeris information, updated satellite cell reference location information, or a satellite identification corresponding to the updated satellite cell.

Further, in another embodiment of the present disclosure, the first trigger event includes at least one of the following: a new radio (NR) measurement event, a trigger event based on the relative locational relationship between the UE and the satellite cell reference location, a trigger event based on the relative locational relationship between the UE and the satellite, or a time-based trigger event.

Further, in another embodiment of the present disclosure, the above-mentioned apparatus is further configured to:

receive a second trigger event sent by the network device;

when the second trigger event occurs, send an update request to the network device;

receive updated information indicated by the network device, where the updated information includes at least one of the following: updated satellite ephemeris information, updated satellite cell reference location information, or a satellite identification corresponding to the updated satellite cell.

Further, in another embodiment of the present disclosure, the second trigger event includes at least one of the following: a new NR measurement event, a trigger event based on the relative locational relationship between the UE and the satellite cell reference location, a trigger event based on the relative locational relationship between the UE and the satellite, or a time-based trigger event.

Further, in another embodiment of the present disclosure, the determining module 1202 is configured to determine the satellite cell reference location information according to the information indicated by the network device, and determine a distance between the UE and the satellite cell reference location according to the satellite cell reference location information.

Figure 13:
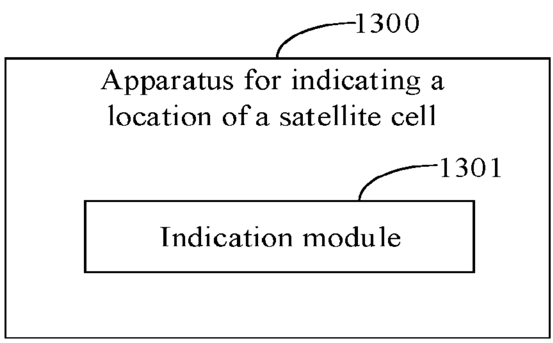
FIG. 13 is a schematic structural diagram of an apparatus for indicating a location of a satellite cell provided by another embodiment of the present disclosure.

FIG. 13 is a schematic structural diagram of a positioning apparatus provided by another embodiment of the present disclosure. As shown in FIG. 13, the apparatus 13M) may include an indication module 1301, configured to indicate information to a UE, where the information includes at least one of the following: satellite ephemeris information, satellite cell reference location information, or a satellite identification corresponding to the satellite cell.

To sum up, in the apparatus for indicating a location of a satellite cell provided by the embodiment of the present disclosure, the UE can receive information indicated by the network device, and the information includes at least one of the following: satellite ephemeris information, satellite cell reference location information, or the satellite identification corresponding to the satellite cell; and, the UE may determine the relative locational relationship between the UE and the satellite cell reference location according to the information indicated by the network device, so that the CHO trigger condition based on the relative locational relationship between the UE and the satellite cell reference location can be introduced later. In the embodiments of the present disclosure, the satellite cell reference location information is: the relative locational relationship between the satellite cell reference location and the corresponding satellite, and/or, the relative locational relationship between the satellite cell reference location and the sub-satellite point of the corresponding satellite. And, since the satellite cell reference location information does not move with the movement of the satellite, the network device does not need to frequently update the satellite cell reference location information when performing cell handover based on location, thereby reducing signaling overhead.

In an embodiment of the present disclosure, the satellite cell reference location information includes: the relative locational relationship between the satellite cell reference location and the corresponding satellite, and/or, the relative locational relationship between the satellite cell reference location and the sub-satellite point of the corresponding satellite; where the satellite cell reference location includes a location of any reference point in the satellite cell.

Further, in another embodiment of the present disclosure, the satellite cell reference location includes a location of a cell center point of the satellite cell.

Further, in another embodiment of the present disclosure, the above indication module 1301 is further configured to:

indicate the satellite cell reference location information to the UE according to a protocol.

Further, in another embodiment of the present disclosure, the above indication module 1301 is further configured to send the satellite cell reference location information to the UE.

Further, in another embodiment of the present disclosure, the above indication module 1301 is further configured to carry the satellite cell reference location information in the satellite ephemeris information, and send the satellite cell reference location information to the UE through the satellite ephemeris information.

Further, in another embodiment of the present disclosure, the above indication module 1301 is further configured to carry the satellite cell reference location information in an RRC reconfiguration message, and send the satellite cell reference location information to the UE through the RRC reconfiguration message.

Further, in another embodiment of the present disclosure, the above indication module 1301 is further configured to carry the satellite cell reference location information in CHO configuration information, and send the satellite cell reference location information to the UE through the CHO configuration information.

Further, in another embodiment of the present disclosure, the satellite cell includes at least one of the following: a serving satellite cell of the UE, a neighbour satellite cell of the serving satellite cell, a candidate satellite cell indicated in CHO configuration information, and a satellite cell designated by other network device.

Further, in another embodiment of the present disclosure, the above indication module 1301 is further configured to determine the satellite cell reference location and a location of the satellite, and indicate to the UE a relative locational relationship between the satellite cell reference location and the satellite according to the satellite cell reference location and the location of the satellite.

Further, in another embodiment of the present disclosure, the above indication module 1301 is further configured to determine the satellite cell reference location and a location of the sub-satellite point of the satellite, and indicate to the UE a relative locational relationship between the satellite cell reference location and the sub-satellite point of the satellite according to the satellite cell reference location and the location of the sub-satellite point of the satellite.

Further, in another embodiment of the present disclosure, the above-mentioned apparatus is further configured to determine the satellite cell reference location in an earth-centered earth-fixed (ECEF) coordinate system according to a velocity vector of the satellite cell.

Further, in another embodiment of the present disclosure, the above-mentioned apparatus is further configured to: determine the location of the sub-satellite point of the corresponding satellite according to at least one method of determining according to the track of the sub-satellite point, determining in the ECEF coordinate system according to the velocity vector of the sub-satellite point of the satellite, and determining according to the satellite ephemeris information.

Further, in another embodiment of the present disclosure, the representation manner of the satellite cell reference location information includes at least one of the following:

- represented by a coordinate location of the satellite cell reference location in a coordinate system with the satellite as an origin;
- represented by a coordinate location of the satellite cell reference location in a coordinate system with the satellite sub-satellite point as the origin;
- represented by a distance between the satellite cell reference location and the satellite;
- represented by a distance between the satellite cell reference location and the sub-satellite point of the satellite;
- represented by an angle between the satellite cell reference location and the satellite;
- represented by an angle between the satellite cell reference location and the sub-satellite point of the satellite;
- represented by an azimuth between the satellite cell reference location and the satellite;
- represented by an azimuth between the satellite cell reference location and the sub-satellite point of the satellite;
- represented by a movement direction of the satellite;
- represented by a movement direction of the sub-satellite point of the satellite.

Further, in another embodiment of the present disclosure, the above-mentioned apparatus is further configured to measure whether relevant information of the satellite cell changes, and, when the relevant information of the satellite cell changes, indicate updated information to the UE, where the updated information includes at least one of the following: updated satellite ephemeris information, updated satellite cell reference location information, or the satellite identification corresponding to the updated satellite cell.

Further, in another embodiment of the present disclosure, the above-mentioned apparatus is further configured to configure a first trigger event to the UE, receive a determination result sent by the UE, and, when the determination result indicates that the first trigger event occurs, indicate the updated information to the UE, where the updated information includes at least one of the following: updated satellite ephemeris information, updated satellite cell reference location information, or the satellite identification corresponding to the updated satellite cell.

Further, in another embodiment of the present disclosure, the first trigger event includes at least one of the following: a new NR measurement event, a trigger event based on the relative locational relationship between the UE and the satellite cell reference location, a trigger event based on the relative locational relationship between the UE and the satellite, or a time-based trigger event.

Further, in another embodiment of the present disclosure, the above-mentioned apparatus is further configured to send a second trigger event to the UE, receive an update request sent by the UE, and indicate updated information to the UE, the updated information including at least one of the following: updated satellite ephemeris information, updated satellite cell reference location information, or the satellite identification corresponding to the updated satellite cell.

Further, in another embodiment of the present disclosure, the second trigger event includes at least one of the following: a new NR measurement event, a trigger event based on the relative locational relationship between the UE and the satellite cell reference location, a trigger event based on the relative locational relationship between the UE and the satellite, or a time-based trigger event.

The computer storage medium provided by the embodiments of the present disclosure stores an executable program; after the executable program is executed by a processor, the method shown in any one of FIG. 1 to 5 or 6 to 11 can be implemented.

In order to realize the above-mentioned embodiments, the present disclosure further proposes a computer program product, including a computer program. When the computer program is executed by a processor, the method shown in any one of FIG. 1 to 5 or 6 to 11 is implemented.

In addition, in order to realize the above-mentioned embodiments, the present disclosure further proposes a computer program, when the program is executed by a processor, the method as shown in any one of FIG. 1 to 5 or 6 to 11 can be realized.

Figure 14:
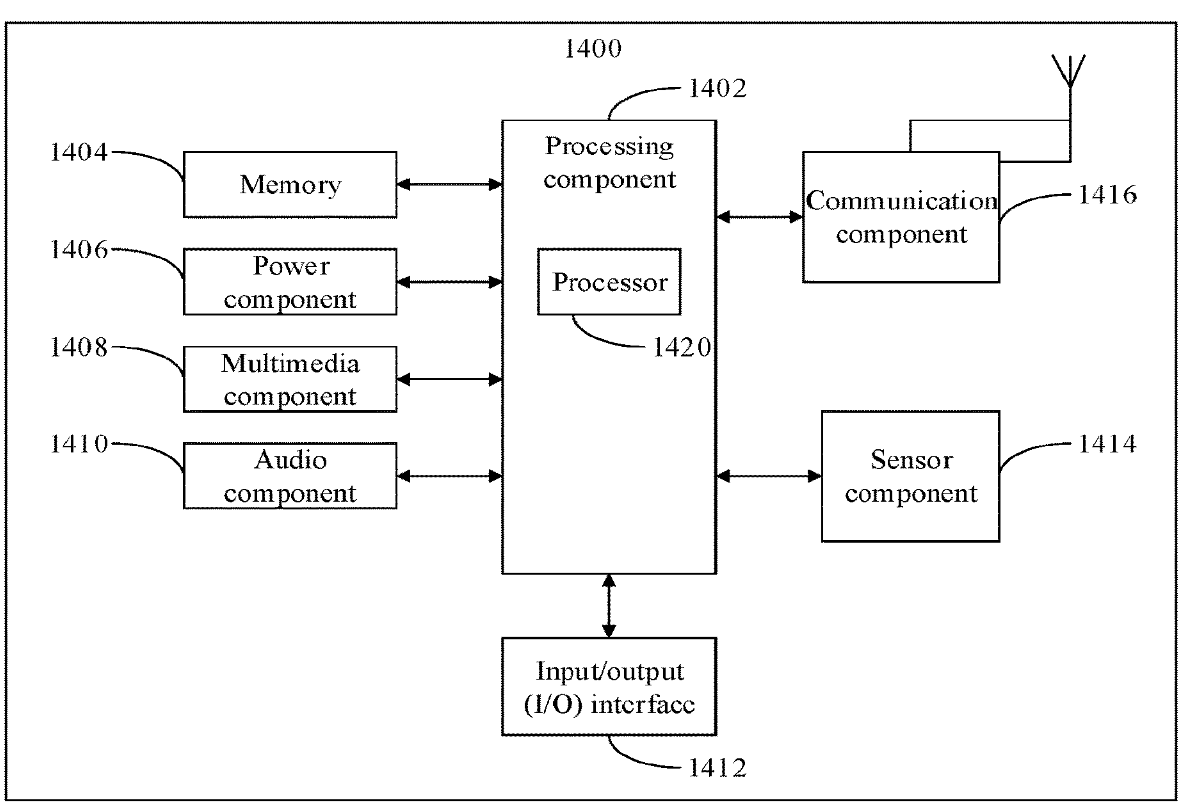
FIG. 14 is a block diagram of a user equipment provided by an embodiment of the present disclosure.

FIG. 14 is a block diagram of a user equipment (UE) 1400 provided by an embodiment of the present disclosure. For example, the UE 1400 may be a mobile phone, a computer, a digital broadcast terminal device, a messaging device, a gaming console, a tablet, a medical device, exercise equipment, a personal digital assistant, and the like.

Referring to FIG. 14, UE 1400 may include one or more of the following components: a processing component 1402, a memory 1404, a power component 1406, a multimedia component 1408, an audio component 1410, an input/output (I/O) interface 1412, a sensor component 1413, and a communication component 1416.

The processing component 1402 typically controls overall operations of the UE 1400, such as the operations associated with display, telephone calls, data communications, camera operations, and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the UE 1400. Examples of such data include instructions for any applications or methods operated on the UE 1400, contact data, phonebook data, messages, pictures, video, etc. The memory 1404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the UE 1400. The power component 1406 may include a power management system, one or more power sources, and any other components associated with the generation, management, and distribution of power in the UE 1400.

The multimedia component 1408 includes a screen providing an output interface between the UE 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and the rear camera may receive an external multimedia datum while the UE 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone (MIC) configured to receive an external audio signal when the UE 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1413 includes one or more sensors to provide status assessments of various aspects of the LIE 1400. For instance, the sensor component 1413 may detect an open/closed status of the UE 1400, relative positioning of components, e.g., the display and the keypad, of the UE 1400, a change in location of the UE 1400 or a component of the UE 1400, a presence or absence of user contact with the UE 1400, an orientation or an acceleration/deceleration of the UE 1400, and a change in temperature of the UE 1400. The sensor component 1413 may include a proximity sensor configured to detect the presence of nearby objects without any physical contact. The sensor component 1413 may also include a light sensor, such as a CMOS or CCD image sensor, for use in imaging applications. In some embodiments, the sensor component 1413 may also include an accelerometer sensor, a gyroscope sensor, a magnetic sensor, a pressure sensor, or a temperature sensor.

The communication component 1416 is configured to facilitate communication, wired or wirelessly, between the UE 1400 and other devices. The UE 1400 can access a wireless network based on a communication standard, such as WiFi, 2G, or 3G, or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the UE 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

Figure 15:
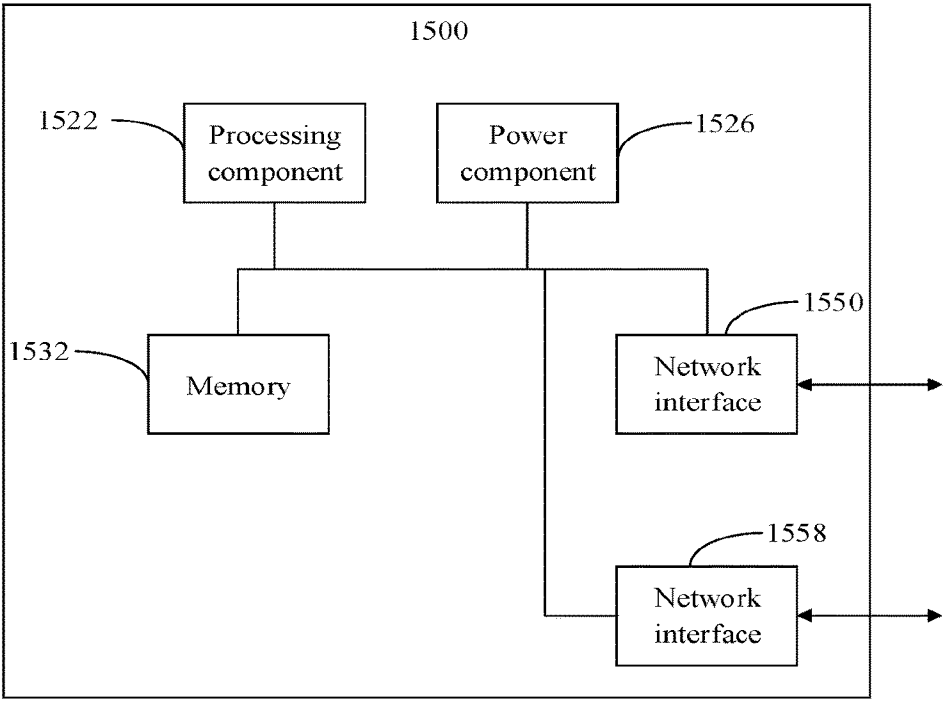
FIG. 15 is a block diagram of a network device provided by an embodiment of the present disclosure.

FIG. 15 is a block diagram of a network device 1500 provided by an embodiment of the present application. For example, the network device 1500 may be provided as a network device. Referring to FIG. 15, the network device 1500 includes a processing component 1515 that further includes one or more processors, and memory resources represented by a memory 1532 for storing instructions executable by the processing component 1522, such as application programs. The application programs stored in the memory 1532 may include one or more modules each corresponding to a set of instructions. Further, the processing component 1515 is configured to execute the instructions to perform any of the above described methods performed by the network device, for example, the method shown in FIG. 1.

The network device 1500 may also include a power component 1526 configured to perform power management of the network device 1500, wired or wireless network interface(s) 1550 configured to connect the network device 1500 to a network, and an input/output (I/O) interface 1558. The network device 1500 may operate based on an operating system stored in the memory 1532, such as Windows Server™, Mac OS X™. Unix™, Linux™, Free BSD™ or the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including the common general knowledge or habitual technical means in the technical field not disclosed in the present disclosure. The specification and embodiments are considered as exemplary only, and a true scope and spirit of the present disclosure is indicated by the appending claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for indicating a location of a satellite cell, performed by a user equipment (UE), wherein the method comprises:

receiving information indicated by a network device, wherein the information comprises at least one of following: satellite ephemeris information, satellite cell reference location information, or a satellite identification corresponding to a satellite cell; and determining a relative locational relationship between the UE and a satellite cell reference location according to the information indicated by the network device;

wherein the satellite cell reference location information comprises at least one of:

a relative locational relationship between the satellite cell reference location and a corresponding satellite, or, a relative locational relationship between the satellite cell reference location and a sub-satellite point of the corresponding satellite;

wherein the satellite cell reference location comprises a location of any reference point in the satellite cell;

wherein the method further comprises:

receiving a first trigger event configured by the network device;

starting a measurement to obtain a measurement result;

determining whether the first trigger event occurs to obtain a determination result;

sending the determination result to the network device;

wherein the first trigger event comprises at least one of following: a new radio (NR) measurement event, a trigger event based on the relative locational relationship between the UE and the satellite cell reference location, a trigger event based on a relative locational relationship between the UE and the satellite, and a time-based trigger event.

2. The method according to claim 1, wherein the satellite cell reference location comprises a location of a cell center point of the satellite cell.

3. The method according to claim 1, wherein the receiving the satellite cell reference location information indicated by the network device comprises:

determining the satellite cell reference location information indicated by the network device according to a protocol.

4. The method according to claim 1, wherein the receiving the satellite cell reference location information indicated by the network device comprises:

receiving the satellite cell reference location information sent by the network device.

5. The method according to claim 2, wherein the receiving the satellite cell reference location information sent by the network device comprises:

receiving the satellite cell reference location information carried in the satellite ephemeris information.

6. The method according to claim 4, wherein the receiving the satellite cell reference location information sent by the network device comprises:

receiving the satellite cell reference location information carried in a radio resource control (RRC) reconfiguration message.

7. The method according to claim 4, wherein the receiving the satellite cell reference location information sent by the network device comprises:

receiving the satellite cell reference location information carried in a conditional handover (CHO) configuration information.

8. The method according to claim 1, wherein the satellite cell comprises at least one of following: a serving satellite cell of the UE, a neighbor satellite cell of the serving satellite cell, a candidate satellite cell indicated in CHO configuration information, or a satellite cell designated by another network device.

9. The method according to claim 1, wherein a representation manner of the satellite cell reference location information comprises at least one of following:

represented by a coordinate location of the satellite cell reference location in a coordinate system with the satellite as an origin;

represented by a coordinate location of the satellite cell reference location in a coordinate system with the sub-satellite point of the satellite as an origin;

represented by a distance between the satellite cell reference location and the satellite;

represented by a distance between the satellite cell reference location and the sub-satellite point of the satellite;

represented by an angle between the satellite cell reference location and the satellite;

represented by an angle between the satellite cell reference location and the sub-satellite point of the satellite;

represented by an azimuth between the satellite cell reference location and the satellite;

represented by an azimuth between the satellite cell reference location and the sub-satellite point of the satellite;

represented by a movement direction of the satellite; or represented by a movement direction of the sub-satellite point of the satellite.

10. The method according to claim 1, further comprising:

receiving updated information indicated by the network device, wherein the updated information comprises at least one of following: updated satellite ephemeris information, updated satellite cell reference location information, or a satellite identification corresponding to an updated satellite cell.

11. The method according to claim 1, further comprising:

receiving a second trigger event sent by the network device;

in response to an occurrence of the second trigger event, sending an update request to the network device;

receiving updated information indicated by the network device, wherein the updated information comprises at least one of following: updated satellite ephemeris information, updated satellite cell reference location information, or a satellite identification corresponding to an updated satellite cell, wherein the second trigger event comprises at least one of following: a new NR measurement event, a trigger event based on the relative locational relationship between the UE and the satellite cell reference location, a trigger event based on a relative locational relationship between the UE and the satellite, or a time-based trigger event.

12. The method according to claim 1, wherein the determining the relative locational relationship between the UE and the satellite cell reference location according to the information indicated by the network device comprises:

determining the satellite cell reference location information according to the information indicated by the network device;

determining a distance between the UE and the satellite cell reference location according to the satellite cell reference location information.

13. A method for indicating a location of a satellite cell, performed by a network device, wherein the method comprises:

indicating information to a UE, wherein the information comprises at least one of following: satellite ephemeris information, satellite cell reference location information, or a satellite identification corresponding to a satellite cell;

wherein the satellite cell reference location information comprises at least one of: a relative locational relationship between a satellite cell reference location and a corresponding satellite, or, a relative locational relationship between the satellite cell reference location and a sub-satellite point of the corresponding satellite;

wherein the satellite cell reference location comprises a location of any reference point in the satellite cell;

wherein the method further comprises:

configuring a first trigger event to the UE;

receiving a determination result sent by the UE;

wherein the first trigger event comprises at least one of following: a new NR measurement event, a trigger event based on the relative locational relationship between the UE and the satellite cell reference location, a trigger event based on a relative locational relationship between the UE and the satellite, or a time-based trigger event.

14. The method according to claim 13, wherein the satellite cell reference location comprises a location of a center point of the satellite cell.

15. The method according to claim 13, wherein the indicating the satellite cell reference location information to the UE comprises:

indicating the satellite cell reference location information to the UE according to a protocol.

16. The method according to claim 13, wherein the indicating the satellite cell reference location information to the UE comprises:

sending the satellite cell reference location information to the UE.

17. The method according to claim 16, wherein the sending the satellite cell reference location information to the UE comprises:

carrying the satellite cell reference location information in the satellite ephemeris information, and sending the satellite cell reference location information to the UE through the satellite ephemeris information.

* * * * *